United States Patent
Bassi et al.

(10) Patent No.: US 12,137,111 B2
(45) Date of Patent: Nov. 5, 2024

(54) ASSET DISCOVERY ENGINE WITH DEEP VULNERABILITIES SCANNER

(71) Applicant: Honeywell International Inc., Charlotte, NC (US)

(72) Inventors: Atul Bassi, Bangalore (IN); Tarun Gupta, Bangalore (IN); Rohit Jain, Indore (IN); Anusha C, Bangalore (IN); Israel Rozenblit, Ramla (IL)

(73) Assignee: Honeywell International Inc., Charlotte, NC (US)

( * ) Notice: Subject to any disclaimer, the term of this patent is extended or adjusted under 35 U.S.C. 154(b) by 167 days.

(21) Appl. No.: 17/823,730

(22) Filed: Aug. 31, 2022

(65) Prior Publication Data

US 2023/0156030 A1    May 18, 2023

Related U.S. Application Data

(60) Provisional application No. 63/280,977, filed on Nov. 18, 2021.

(51) Int. Cl.
    *H04L 9/40* (2022.01)

(52) U.S. Cl.
    CPC ...... *H04L 63/1433* (2013.01); *H04L 63/1425* (2013.01)

(58) Field of Classification Search
    None
    See application file for complete search history.

(56) References Cited

U.S. PATENT DOCUMENTS

| | | | |
|---|---|---|---|
| 9,898,607 B2 * | 2/2018 | Chand | G06F 21/64 |
| 2014/0137257 A1 * | 5/2014 | Martinez | H04L 63/1433 726/25 |
| 2014/0306341 A1 | 10/2014 | Hou et al. | |
| 2016/0050225 A1 * | 2/2016 | Carpenter | G06F 21/577 726/25 |

(Continued)

FOREIGN PATENT DOCUMENTS

WO    2021/138299 A1    7/2021

OTHER PUBLICATIONS

European search report Mailed on Jan. 16, 2023 for EP Application No. 22207931.

(Continued)

*Primary Examiner* — Christopher C Harris
(74) *Attorney, Agent, or Firm* — Alston & Bird LLP

(57) ABSTRACT

Various embodiments described herein relate to an asset discovery engine with a deep vulnerabilities scanner with respect to assets in an industrial network. In an embodiment, a request to perform an asset vulnerability assessment of one or more assets within a network is received, the request comprising an asset descriptor describing the one or more assets. In response to the request, aggregated asset property data associated with the one or more assets is obtained based on the asset descriptor. Furthermore, the asset vulnerability assessment is performed based on the aggregated asset property data and asset vulnerability signature data stored in an asset vulnerability signature repository. In response to determining that the asset vulnerability assessment satisfies a defined criterion, one or more actions associated with the network are performed.

20 Claims, 31 Drawing Sheets

(56) References Cited

U.S. PATENT DOCUMENTS

| | | | |
|---|---|---|---|
| 2016/0127207 A1* | 5/2016 | Zaccaria | G05B 19/0428 |
| | | | 709/224 |
| 2020/0389473 A1* | 12/2020 | Rondeau | H04W 12/121 |
| 2021/0142198 A1* | 5/2021 | Maturana | G06N 7/01 |
| 2021/0226927 A1* | 7/2021 | Crabtree | G06N 5/022 |
| 2021/0306341 A1 | 9/2021 | Tiwari et al. | |

OTHER PUBLICATIONS

Intention to grant Mailed on Nov. 27, 2023 for EP Application No. 22207931, 9 page(s).

Decision to grant a European patent Mailed on Mar. 21, 2024 for EP Application No. 22207931, 2 page(s).

SA Office Action Mailed on Apr. 29, 2024 for SA Application No. 122440616, 12 page(s).

SA Office Action Mailed on Jun. 25, 2024 for SA Application No. 122440616, 12 page(s).

\* cited by examiner

ASSET DISCOVERY ENGINE WITH DEEP VULNERABILITIES SCANNER

CROSS REFERENCE TO RELATED APPLICATIONS

This application claims the benefit of U.S. Provisional Patent Application No. 63/280,977, titled "ASSET DISCOVERY ENGINE WITH DEEP VULNERABLITIES SCANNER," and filed on Nov. 18, 2021, the entirety of which is hereby incorporated by reference.

TECHNICAL FIELD

The present disclosure relates generally to industrial network security, and more particularly to an asset discovery engine with a deep vulnerabilities scanner with respect to assets in an industrial network.

BACKGROUND

An industrial network (e.g., an industrial network associated with industrial automation and control systems) often includes thousands of assets such as, for example, sensors, input/output modules, controllers, firewall devices, supervisory nodes, application nodes, and/or other assets. Furthermore, different assets in an industrial network often include different sets of software and/or different sets of hardware connected to the same network or a different network via switches, routers, firewall devices, etc. As such, there are numerous technical challenges related to performing network security management with respect to an industrial network.

SUMMARY

The details of some embodiments of the subject matter described in this specification are set forth in the accompanying drawings and the description below. Other features, aspects, and advantages of the subject matter will become apparent from the description, the drawings, and the claims.

In an embodiment, a system comprises one or more processors, a memory, and one or more programs stored in the memory. The one or more programs comprise instructions configured to receive a request to perform an asset vulnerability assessment of one or more assets within a network. In one or more embodiments, the request comprises an asset descriptor describing the one or more assets. The one or more programs comprise instructions which, when executed by the one or more processors and in response to the request, cause the device to obtain, based on the asset descriptor, aggregated asset property data associated with the one or more assets. The one or more programs also comprise instructions which, when executed by the one or more processors and in response to the request, cause the device to perform the asset vulnerability assessment based on the aggregated asset property data and asset vulnerability signature data stored in an asset vulnerability signature repository. Additionally, the one or more programs comprise instructions which, when executed by the one or more processors and in response to the request, cause the device to perform one or more actions associated with the network in response to determining that the asset vulnerability assessment satisfies a defined criterion.

In another embodiment, a method comprises, at a device with one or more processors and a memory, receiving a request to perform an asset vulnerability assessment of one or more assets within a network. In one or more embodiments, the request comprises an asset descriptor describing the one or more assets. In response to the request, the method comprises obtaining, based on the asset descriptor, aggregated asset property data associated with the one or more assets. In response to the request, the method also comprises performing the asset vulnerability assessment based on the aggregated asset property data and asset vulnerability signature data stored in an asset vulnerability signature repository. In response to the request, the method also comprises performing one or more actions associated with the network in response to determining that the asset vulnerability assessment satisfies a defined criterion.

In yet another embodiment, a non-transitory computer-readable storage medium comprises one or more programs for execution by one or more processors of a device. The one or more programs comprise instructions which, when executed by the one or more processors, cause the device to receive a request to perform an asset vulnerability assessment of one or more assets within a network. In one or more embodiments, the request comprises an asset descriptor describing the one or more assets. The one or more programs comprise instructions which, when executed by the one or more processors and in response to the request, cause the device to obtain, based on the asset descriptor, aggregated asset property data associated with the one or more assets. The one or more programs comprise instructions which, when executed by the one or more processors and in response to the request, cause the device to perform the asset vulnerability assessment based on the aggregated asset property data and asset vulnerability signature data stored in an asset vulnerability signature repository. The one or more programs comprise instructions which, when executed by the one or more processors and in response to the request, cause the device to perform one or more actions associated with the network in response to determining that the asset vulnerability assessment satisfies a defined criterion.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
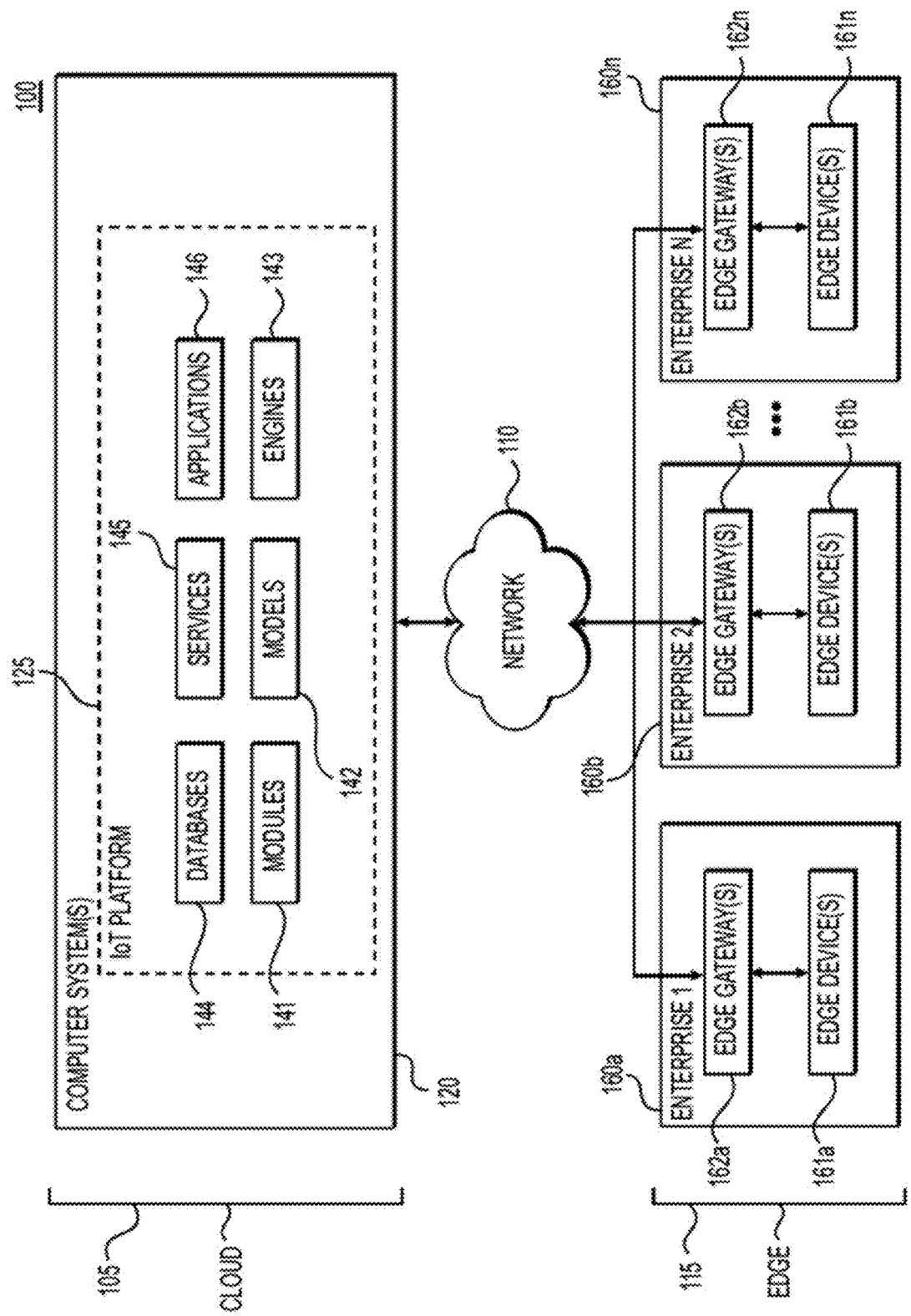
FIG. 1 illustrates an exemplary networked computing system environment, in accordance with one or more embodiments described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase can be included in at least one embodiment of the present disclosure, and can be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some embodiments, or it can be excluded.

In general, the present disclosure provides for an "Internet-of-Things" or "IoT" platform for enterprise performance management that uses real-time accurate models and visual analytics to deliver intelligent actionable recommendations for sustained peak performance of an enterprise or organization. The IoT platform is an extensible platform that is portable for deployment in any cloud or data center environment for providing an enterprise-wide, top to bottom view, displaying the status of processes, assets, people, and safety. Further, the IoT platform of the present disclosure supports end-to-end capability to execute digital twins against process data and to translate the output into actionable insights, as detailed in the following description.

An industrial network (e.g., an industrial network associated with industrial automation and control systems) often includes thousands of assets such as, for example, sensors, input/output modules, controllers, firewall devices, supervisory nodes, application nodes, and/or other assets. Furthermore, different assets in an industrial network often include different sets of software and/or different sets of hardware connected to the same network or a different network via switches, routers, firewall devices, etc. As such, there are numerous technical challenges related to performing network security management with respect to an industrial network.

In an example, an infrastructure of a process industry plant such as a petrochemical plant, an oil and gas refinery, a pharmaceutical plan, a food and beverage plant, a fertilizer plant, a power plant, or another type of industrial plant is generally susceptible to a cyberattack via an industrial automation system and/or a control system of the industrial plant. An industrial automation system and/or a control system of an industrial plant is generally directly or indirectly connected to information technology networks such as a main control room for the industrial plant, a satellite rack room for the industrial plant, a plant network of the industrial plant, the Internet. As such, cyber attackers often exploit an industrial automation system and/or a control system of an industrial plant to take advantage of known and/or newly discovered infrastructure vulnerabilities of the industrial plant. Unlike computers and/or other computing devices implemented via an internet technology network, portions of an industrial automation system and/or a control system of an industrial plant generally include a distributed control system, process controllers, programmable logic controllers, supervisory control and data acquisition systems, computing stations (e.g., consoles, human-machine interfaces, etc.) and/or another type of system configured for process control functionalities with respect to the industrial plant. The portions of the industrial plant associated with process control functionalities is therefore generally susceptible to a cyberattack.

In another example, an industrial plant includes assets in different levels (e.g., different zones) such as, for example, assets (e.g., field instrument assets) in level 0 of an industrial network (e.g., zone 0 of the industrial plant), assets (e.g., embedded interface boards and controllers) in level 1 of an industrial network (e.g., zone 1 of the industrial plant), assets (e.g., supervisory nodes) in level 2 of an industrial network (e.g., zone 2 of the industrial plant), and assets (e.g., application nodes) in level 3 of an industrial network (e.g., zone 3 of the industrial plant). In another example, an industrial plant includes respective assets with respective software agents and/or data privileges that generally involve manual intervention (e.g., creating permission for installation of software, copying software, installing software in respective assets, etc.) to update potentially thousands of assets. In another example, an industrial plant includes third-party assets and controllers that include controller backplane assets. As such, the third-party assets may be vulnerable to a cyberattack due to unknown functionality with respect to the controllers.

Thus, to address these and/or other issues, an asset discovery engine with a deep vulnerabilities scanner with respect to assets in a network (e.g., an industrial network) is provided. In various embodiments, aggregated asset properties are generated for assets discovered in a network to perform cybersecurity vulnerability assessment of the assets using the aggregated asset properties. In various embodiments, aggregated asset properties are generated by monitoring network traffic broadcasted to the assets and/or based on responses from the assets. In various embodiments, respective risk scores are generated for the assets based on the cybersecurity vulnerability assessment.

In one or more embodiments, the asset discovery engine is a smart asset discovery engine is provided to discover, collect and/or analyze data associated with assets in a network. In one or more embodiments, the asset discovery engine is utilized by a web-based application with cloud connectivity to provide asset vulnerability assessment with respect to the assets. In one or more embodiments, the web-based application is deployed in a Level 3 network machine configured to discover active assets in the network, including third-party assets. In one or more embodiments, active assets (e.g., assets from Level 0 to Level 2 in the network) with vulnerabilities are determined in response to discovery of the active assets. Accordingly, with the asset discovery engine disclosed herein, likelihood of a cyberattack with respect to a network (e.g., an industrial network) is reduced. Moreover, with the asset discovery engine disclosed herein, performance of a network (e.g., an industrial network) and/or assets within a network are improved. For instance, by employing one or more techniques disclosed herein, network performance, asset performance and/or process performance is optimized. Additionally, performance of a processing system associated with cybersecurity vulnerability assessment of assets is improved by employing one or more techniques disclosed herein. For example, a number of computing resources, a number of a storage requirements, and/or number of errors associated with cybersecurity vulnerability assessment of assets is reduced by employing one or more techniques disclosed herein.

FIG. 1 illustrates an exemplary networked computing system environment 100, according to the present disclosure. As shown in FIG. 1, networked computing system environment 100 is organized into a plurality of layers including a cloud 105 (e.g., cloud layer), a network 110 (e.g., a network layer), and an edge 115 (e.g., edge layer). As detailed further below, components of the edge 115 are in communication with components of the cloud 105 via network 110.

In various embodiments, network 110 is any suitable network or combination of networks and supports any appropriate protocol suitable for communication of data to and from components of the cloud 105 and between various other components in the networked computing system environment 100 (e.g., components of the edge 115). According to various embodiments, network 110 includes a public network (e.g., the Internet), a private network (e.g., a network within an organization), or a combination of public and/or private networks. According to various embodiments, network 110 is configured to provide communication between various components depicted in FIG. 1. According to various embodiments, network 110 comprises one or more networks that connect devices and/or components in the network layout to allow communication between the devices and/or components. For example, in one or more embodiments, the network 110 is implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 110 is implemented using cellular networks, satellite, licensed radio, or a combination of cellular, satellite, licensed radio, and/or unlicensed radio networks.

Components of the cloud 105 include one or more computer systems 120 that form a so-called "Internet-of-Things" or "IoT" platform 125. It should be appreciated that "IoT platform" is an optional term describing a platform connecting any type of Internet-connected device, and should not be construed as limiting on the types of computing systems useable within IoT platform 125. In particular, in various embodiments, computer systems 120 includes any type or quantity of one or more processors and one or more data storage devices comprising memory for storing and executing applications or software modules of networked computing system environment 100. In one embodiment, the processors and data storage devices are embodied in server-class hardware, such as enterprise-level servers. For example, in an embodiment, the processors and data storage devices comprise any type or combination of application servers, communication servers, web servers, super-computing servers, database servers, file servers, mail servers, proxy servers, and/virtual servers. Further, the one or more processors are configured to access the memory and execute processor-readable instructions, which when executed by the processors configures the processors to perform a plurality of functions of the networked computing system environment 100.

Computer systems 120 further include one or more software components of the IoT platform 125. For example, in one or more embodiments, the software components of computer systems 120 include one or more software modules to communicate with user devices and/or other computing devices through network 110. For example, in one or more embodiments, the software components include one or more modules 141, models 142, engines 143, databases 144, services 145, and/or applications 146, which may be stored in/by the computer systems 120 (e.g., stored on the memory), as detailed with respect to FIG. 2 below. According to various embodiments, the one or more processors are configured to utilize the one or more modules 141, models 142, engines 143, databases 144, services 145, and/or applications 146 when performing various methods described in this disclosure.

Accordingly, in one or more embodiments, computer systems 120 execute a cloud computing platform (e.g., IoT platform 125) with scalable resources for computation and/or data storage, and may run one or more applications on the cloud computing platform to perform various computer-implemented methods described in this disclosure. In some embodiments, some of the modules 141, models 142, engines 143, databases 144, services 145, and/or applications 146 are combined to form fewer modules, models, engines, databases, services, and/or applications. In some embodiments, some of the modules 141, models 142, engines 143, databases 144, services 145, and/or applications 146 are separated into separate, more numerous modules, models, engines, databases, services, and/or applications. In some embodiments, some of the modules 141, models 142, engines 143, databases 144, services 145, and/or applications 146 are removed while others are added.

The computer systems 120 are configured to receive data from other components (e.g., components of the edge 115) of networked computing system environment 100 via network 110. Computer systems 120 are further configured to utilize the received data to produce a result. According to various embodiments, information indicating the result is transmitted to users via user computing devices over network 110. In some embodiments, the computer systems 120 is a server system that provides one or more services including providing the information indicating the received data and/or the result(s) to the users. According to various embodiments, computer systems 120 are part of an entity which include any type of company, organization, or institution that implements one or more IoT services. In some examples, the entity is an IoT platform provider.

Components of the edge 115 include one or more enterprises 160a-160n each including one or more edge devices 161a-161n and one or more edge gateways 162a-162n. For example, a first enterprise 160a includes first edge devices 161a and first edge gateways 162a, a second enterprise 160b includes second edge devices 161b and second edge gateways 162b, and an nth enterprise 160n includes nth edge devices 161n and nth edge gateways 162n. As used herein, enterprises 160a-160n represent any type of entity, facility, or vehicle, such as, for example, companies, divisions, buildings, manufacturing plants, warehouses, real estate facilities, laboratories, aircraft, spacecraft, automobiles, ships, boats, military vehicles, oil and gas facilities, or any other type of entity, facility, and/or entity that includes any number of local devices.

Figure 2:
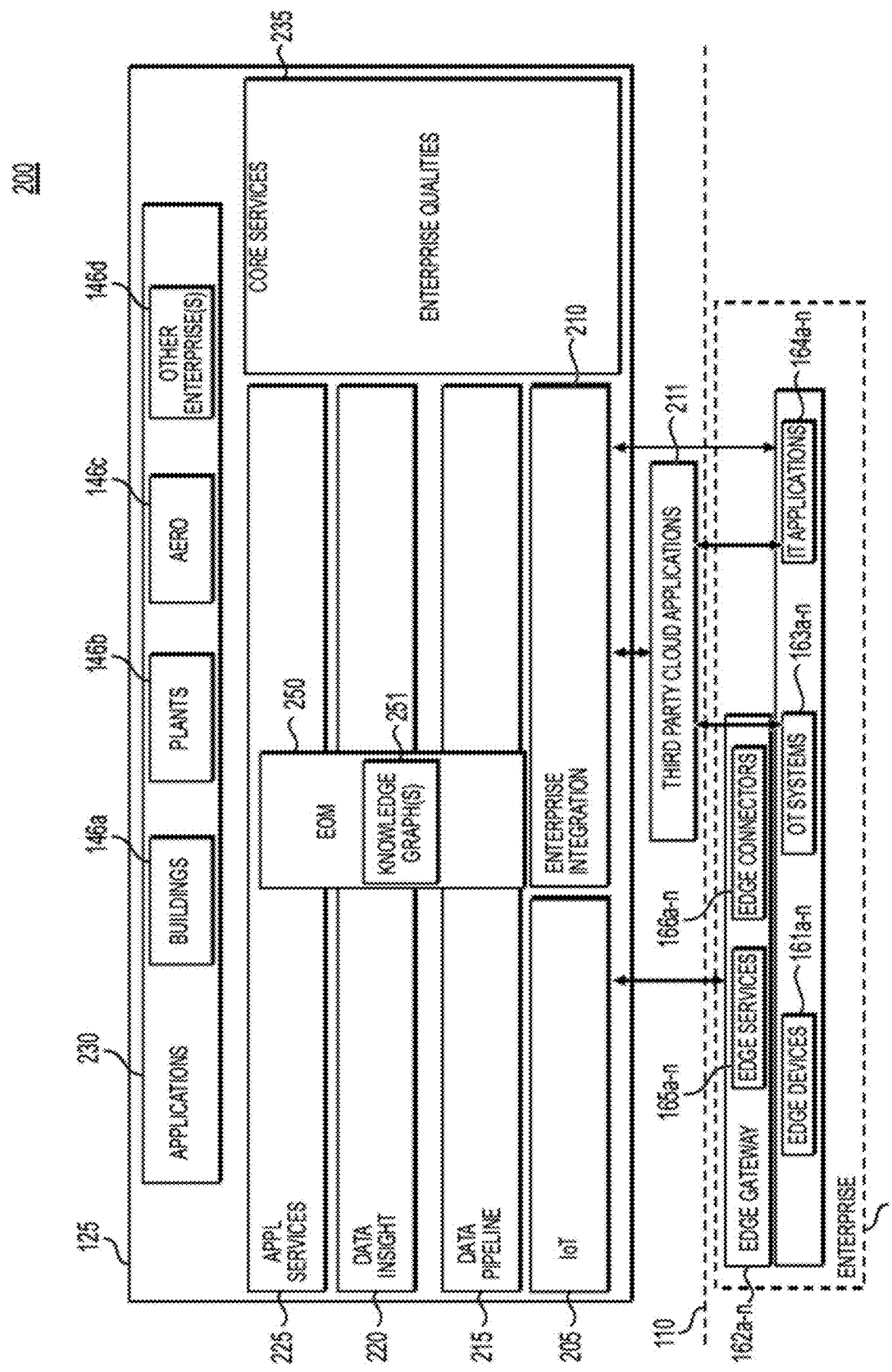
FIG. 2 illustrates a schematic block diagram of a framework of an IoT platform of the networked computing system, in accordance with one or more embodiments described herein.

According to various embodiments, the edge devices 161a-161n represent any of a variety of different types of devices that may be found within the enterprises 160a-160n. Edge devices 161a-161n are any type of device configured to access network 110, or be accessed by other devices through network 110, such as via an edge gateway 162a-162n. According to various embodiments, edge devices 161a-161n are "IoT devices" which include any type of network-connected (e.g., Internet-connected) device. For example, in one or more embodiments, the edge devices 161a-161n include assets, sensors, actuators, processors, computers, valves, pumps, ducts, vehicle components, cameras, displays, doors, windows, security components, boilers, chillers, pumps, HVAC components, factory equipment, and/or any other devices that are connected to the network 110 for collecting, sending, and/or receiving information. Each edge device 161a-161n includes, or is otherwise in communication with, one or more controllers for selectively controlling a respective edge device 161a-161n and/or for sending/receiving information between the edge devices 161a-161n and the cloud 105 via network 110. With reference to FIG. 2, in one or more embodiments, the edge 115 include operational technology (OT) systems 163a-163n and information technology (IT) applications 164a-164n of each enterprise 160a-161n. The OT systems 163a-163n include hardware and software for detecting and/or causing a change, through the direct monitoring and/or control of industrial equipment (e.g., edge devices 161a-161n), assets, processes, and/or events. The IT applications 164a-164n includes network, storage, and computing resources for the generation, management, storage, and delivery of data throughout and between organizations.

The edge gateways 162a-162n include devices for facilitating communication between the edge devices 161a-161n and the cloud 105 via network 110. For example, the edge gateways 162a-162n include one or more communication interfaces for communicating with the edge devices 161a-161n and for communicating with the cloud 105 via network 110. According to various embodiments, the communication interfaces of the edge gateways 162a-162n include one or more cellular radios, Bluetooth, WiFi, near-field communication radios, Ethernet, or other appropriate communication devices for transmitting and receiving information. According to various embodiments, multiple communication interfaces are included in each gateway 162a-162n for providing multiple forms of communication between the edge devices 161a-161n, the gateways 162a-162n, and the cloud 105 via network 110. For example, in one or more embodiments, communication are achieved with the edge devices 161a-161n and/or the network 110 through wireless communication (e.g., WiFi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

According to various embodiments, the edge gateways 162a-162n also include a processor and memory for storing and executing program instructions to facilitate data processing. For example, in one or more embodiments, the edge gateways 162a-162n are configured to receive data from the edge devices 161a-161n and process the data prior to sending the data to the cloud 105. Accordingly, in one or more embodiments, the edge gateways 162a-162n include one or more software modules or components for providing data processing services and/or other services or methods of the present disclosure. With reference to FIG. 2, each edge gateway 162a-162n includes edge services 165a-165n and edge connectors 166a-166n. According to various embodiments, the edge services 165a-165n include hardware and software components for processing the data from the edge devices 161a-161n. According to various embodiments, the edge connectors 166a-166n include hardware and software components for facilitating communication between the edge gateway 162a-162n and the cloud 105 via network 110, as detailed above. In some cases, any of edge devices 161a-n, edge connectors 166a-n, and edge gateways 162a-n have their functionality combined, omitted, or separated into any combination of devices. In other words, an edge device and its connector and gateway need not necessarily be discrete devices.

FIG. 2 illustrates a schematic block diagram of framework 200 of the IoT platform 125, according to the present disclosure. The IoT platform 125 of the present disclosure is a platform for enterprise performance management that uses real-time accurate models and visual analytics to deliver intelligent actionable recommendations and/or analytics for sustained peak performance of the enterprise 160a-160n. The IoT platform 125 is an extensible platform that is portable for deployment in any cloud or data center environment for providing an enterprise-wide, top to bottom view, displaying the status of processes, assets, people, and safety. Further, the IoT platform 125 supports end-to-end capability to execute digital twins against process data and to translate the output into actionable insights, using the framework 200, detailed further below.

As shown in FIG. 2, the framework 200 of the IoT platform 125 comprises a number of layers including, for example, an IoT layer 205, an enterprise integration layer 210, a data pipeline layer 215, a data insight layer 220, an application services layer 225, and an applications layer 230. The IoT platform 125 also includes a core services layer 235 and an extensible object model (EOM) 250 comprising one or more knowledge graphs 251. The layers 205-235 further include various software components that together form each layer 205-235. For example, in one or more embodiments, each layer 205-235 includes one or more of the modules 141, models 142, engines 143, databases 144, services 145, applications 146, or combinations thereof. In some embodiments, the layers 205-235 are combined to form fewer layers. In some embodiments, some of the layers 205-235 are separated into separate, more numerous layers. In some embodiments, some of the layers 205-235 are removed while others may be added.

The IoT platform 125 is a model-driven architecture. Thus, the extensible object model 250 communicates with each layer 205-230 to contextualize site data of the enterprise 160a-160n using an extensible graph based object model (or "asset model"). In one or more embodiments, the extensible object model 250 is associated with knowledge graphs 251 where the equipment (e.g., edge devices 161a-161n) and processes of the enterprise 160a-160n are modeled. The knowledge graphs 251 of EOM 250 are configured to store the models in a central location. The knowledge graphs 251 define a collection of nodes and links that describe real-world connections that enable smart systems. As used herein, a knowledge graph 251: (i) describes real-world entities (e.g., edge devices 161a-161n) and their interrelations organized in a graphical interface; (ii) defines possible classes and relations of entities in a schema; (iii) enables interrelating arbitrary entities with each other; and (iv) covers various topical domains. In other words, the knowledge graphs 251 define large networks of entities (e.g., edge devices 161a-161n), semantic types of the entities, properties of the entities, and relationships between the entities. Thus, the knowledge graphs 251 describe a network of "things" that are relevant to a specific domain or to an enterprise or organization. Knowledge graphs 251 are not limited to abstract concepts and relations, but can also contain instances of objects, such as, for example, documents and datasets. In some embodiments, the knowledge graphs 251 include resource description framework (RDF) graphs. As used herein, a "RDF graph" is a graph data model that formally describes the semantics, or meaning, of information. The RDF graph also represents metadata (e.g., data that describes data). According to various embodiments, knowledge graphs 251 also include a semantic object model. The semantic object model is a subset of a knowledge graph 251 that defines semantics for the knowledge graph 251. For example, the semantic object model defines the schema for the knowledge graph 251.

As used herein, EOM 250 includes a collection of application programming interfaces (APIs) that enables seeded semantic object models to be extended. For example, the EOM 250 of the present disclosure enables a customer's knowledge graph 251 to be built subject to constraints expressed in the customer's semantic object model. Thus, the knowledge graphs 251 are generated by customers (e.g., enterprises or organizations) to create models of the edge devices 161a-161n of an enterprise 160a-160n, and the knowledge graphs 251 are input into the EOM 250 for visualizing the models (e.g., the nodes and links).

The models describe the assets (e.g., the nodes) of an enterprise (e.g., the edge devices 161a-161n) and describe the relationship of the assets with other components (e.g., the links). The models also describe the schema (e.g., describe what the data is), and therefore the models are self-validating. For example, in one or more embodiments, the model describes the type of sensors mounted on any given asset (e.g., edge device 161a-161n) and the type of data that is being sensed by each sensor. According to various embodiments, a KPI framework is used to bind properties of the assets in the extensible object model 250 to inputs of the KPI framework. Accordingly, the IoT platform 125 is an extensible, model-driven end-to-end stack including: two-way model sync and secure data exchange between the edge 115 and the cloud 105, metadata driven data processing (e.g., rules, calculations, and aggregations), and model driven visualizations and applications. As used herein, "extensible" refers to the ability to extend a data model to include new properties/columns/fields, new classes/tables, and new relations. Thus, the IoT platform 125 is extensible with regards to edge devices 161a-161n and the applications 146 that handle those devices 161a-161n. For example, when new edge devices 161a-161n are added to an enterprise 160a-160n system, the new devices 161a-161n will automatically appear in the IoT platform 125 so that the corresponding applications 146 understand and use the data from the new devices 161a-161n.

In some cases, asset templates are used to facilitate configuration of instances of edge devices 161a-161n in the model using common structures. An asset template defines the typical properties for the edge devices 161a-161n of a given enterprise 160a-160n for a certain type of device. For example, an asset template of a pump includes modeling the pump having inlet and outlet pressures, speed, flow, etc. The templates may also include hierarchical or derived types of edge devices 161a-161n to accommodate variations of a base type of device 161a-161n. For example, a reciprocating pump is a specialization of a base pump type and would include additional properties in the template. Instances of the edge device 161*a*-161*n* in the model are configured to match the actual, physical devices of the enterprise 160*a*-160*n* using the templates to define expected attributes of the device 161*a*-161*n*. Each attribute is configured either as a static value (e.g., capacity is 1000 BPH) or with a reference to a time series tag that provides the value. The knowledge graph 251 can automatically map the tag to the attribute based on naming conventions, parsing, and matching the tag and attribute descriptions and/or by comparing the behavior of the time series data with expected behavior. In one or more embodiments, each of the key attribute contributing to one or more metrics to drive a dashboard is marked with one or more metric tags such that a dashboard visualization is generated.

The modeling phase includes an onboarding process for syncing the models between the edge 115 and the cloud 105. For example, in one or more embodiments, the onboarding process includes a simple onboarding process, a complex onboarding process, and/or a standardized rollout process. The simple onboarding process includes the knowledge graph 251 receiving raw model data from the edge 115 and running context discovery algorithms to generate the model. The context discovery algorithms read the context of the edge naming conventions of the edge devices 161*a*-161*n* and determine what the naming conventions refer to. For example, in one or more embodiments, the knowledge graph 251 receives "TMP" during the modeling phase and determine that "TMP" relates to "temperature." The generated models are then published. The complex onboarding process includes the knowledge graph 251 receiving the raw model data, receiving point history data, and receiving site survey data. According to various embodiments, the knowledge graph 251 then uses these inputs to run the context discovery algorithms. According to various embodiments, the generated models are edited and then the models are published. The standardized rollout process includes manually defining standard models in the cloud 105 and pushing the models to the edge 115.

The IoT layer 205 includes one or more components for device management, data ingest, and/or command/control of the edge devices 161*a*-161*n*. The components of the IoT layer 205 enable data to be ingested into, or otherwise received at, the IoT platform 125 from a variety of sources. For example, in one or more embodiments, data is ingested from the edge devices 161*a*-161*n* through process historians or laboratory information management systems. The IoT layer 205 is in communication with the edge services 165*a*-165*n* installed on the edge gateways 162*a*-162*n* through network 110, and the edge services 165*a*-165*n* send the data securely to the IoT platform 205. In some embodiments, only authorized data is sent to the IoT platform 125, and the IoT platform 125 only accepts data from authorized edge gateways 162*a*-162*n* and/or edge devices 161*a*-161*n*. According to various embodiments, data is sent from the edge gateways 162*a*-162*n* to the IoT platform 125 via direct streaming and/or via batch delivery. Further, after any network or system outage, data transfer will resume once communication is re-established and any data missed during the outage will be backfilled from the source system or from a cache of the IoT platform 125. According to various embodiments, the IoT layer 205 also includes components for accessing time series, alarms and events, and transactional data via a variety of protocols.

The enterprise integration layer 210 includes one or more components for events/messaging, file upload, and/or REST/OData. The components of the enterprise integration layer 210 enable the IoT platform 125 to communicate with third party cloud applications 211, such as any application(s) operated by an enterprise in relation to its edge devices. For example, the enterprise integration layer 210 connects with enterprise databases, such as guest databases, customer databases, financial databases, patient databases, etc. The enterprise integration layer 210 provides a standard application programming interface (API) to third parties for accessing the IoT platform 125. The enterprise integration layer 210 also enables the IoT platform 125 to communicate with the OT systems 163*a*-163*n* and IT applications 164*a*-164*n* of the enterprise 160*a*-160*n*. Thus, the enterprise integration layer 210 enables the IoT platform 125 to receive data from the third-party cloud applications 211 rather than, or in combination with, receiving the data from the edge devices 161*a*-161*n* directly.

The data pipeline layer 215 includes one or more components for data cleansing/enriching, data transformation, data calculations/aggregations, and/or API for data streams. Accordingly, in one or more embodiments, the data pipeline layer 215 pre-processes and/or performs initial analytics on the received data. The data pipeline layer 215 executes advanced data cleansing routines including, for example, data correction, mass balance reconciliation, data conditioning, component balancing and simulation to ensure the desired information is used as a basis for further processing. The data pipeline layer 215 also provides advanced and fast computation. For example, cleansed data is run through enterprise-specific digital twins. According to various embodiments, the enterprise-specific digital twins include a reliability advisor containing process models to determine the current operation and the fault models to trigger any early detection and determine an appropriate resolution. According to various embodiments, the digital twins also include an optimization advisor that integrates real-time economic data with real-time process data, selects the right feed for a process, and determines optimal process conditions and product yields.

According to various embodiments, the data pipeline layer 215 employs models and templates to define calculations and analytics. Additionally or alternatively, according to various embodiments, the data pipeline layer 215 employs models and templates to define how the calculations and analytics relate to the assets (e.g., the edge devices 161*a*-161*n*). For example, in an embodiment, a pump template defines pump efficiency calculations such that every time a pump is configured, the standard efficiency calculation is automatically executed for the pump. The calculation model defines the various types of calculations, the type of engine that should run the calculations, the input and output parameters, the preprocessing requirement and prerequisites, the schedule, etc. According to various embodiments, the actual calculation or analytic logic is defined in the template or it may be referenced. Thus, according to various embodiments, the calculation model is employed to describe and control the execution of a variety of different process models. According to various embodiments, calculation templates are linked with the asset templates such that when an asset (e.g., edge device 161*a*-161*n*) instance is created, any associated calculation instances are also created with their input and output parameters linked to the appropriate attributes of the asset (e.g., edge device 161*a*-161*n*).

According to various embodiments, the IoT platform 125 supports a variety of different analytics models including, for example, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 160a-160n performance to identify issues or opportunities, and the potential causes or drivers of the issues or opportunities. The IoT platform 125 includes rich hierarchical symptom-fault models to identify abnormal conditions and their potential consequences. For example, in one or more embodiments, the IoT platform 125 drill downs from a high-level condition to understand the contributing factors, as well as determining the potential impact a lower level condition may have. There may be multiple fault models for a given enterprise 160a-160n looking at different aspects such as process, equipment, control, and/or operations. According to various embodiments, each fault model identifies issues and opportunities in their domain, and can also look at the same core problem from a different perspective. According to various embodiments, an overall fault model is layered on top to synthesize the different perspectives from each fault model into an overall assessment of the situation and point to the true root cause.

According to various embodiments, when a fault or opportunity is identified, the IoT platform 125 provides recommendations about an optimal corrective action to take. Initially, the recommendations are based on expert knowledge that has been pre-programmed into the system by process and equipment experts. A recommendation services module presents this information in a consistent way regardless of source, and supports workflows to track, close out, and document the recommendation follow-up. According to various embodiments, the recommendation follow-up is employed to improve the overall knowledge of the system over time as existing recommendations are validated (or not) or new cause and effect relationships are learned by users and/or analytics.

According to various embodiments, the models are used to accurately predict what will occur before it occurs and interpret the status of the installed base. Thus, the IoT platform 125 enables operators to quickly initiate maintenance measures when irregularities occur. According to various embodiments, the digital twin architecture of the IoT platform 125 employs a variety of modeling techniques. According to various embodiments, the modeling techniques include, for example, rigorous models, fault detection and diagnostics (FDD), descriptive models, predictive maintenance, prescriptive maintenance, process optimization, and/or any other modeling technique.

According to various embodiments, the rigorous models are converted from process design simulation. In this manner, process design is integrated with feed conditions and production requirement. Process changes and technology improvement provide business opportunities that enable more effective maintenance schedule and deployment of resources in the context of production needs. The fault detection and diagnostics include generalized rule sets that are specified based on industry experience and domain knowledge and can be easily incorporated and used working together with equipment models. According to various embodiments, the descriptive models identifies a problem and the predictive models determines possible damage levels and maintenance options. According to various embodiments, the descriptive models include models for defining the operating windows for the edge devices 161a-161n.

Predictive maintenance includes predictive analytics models developed based on rigorous models and statistic models, such as, for example, principal component analysis (PCA) and partial least square (PLS). According to various embodiments, machine learning methods are applied to train models for fault prediction. According to various embodiments, predictive maintenance leverages FDD-based algorithms to continuously monitor individual control and equipment performance. Predictive modeling is then applied to a selected condition indicator that deteriorates in time. Prescriptive maintenance includes determining an optimal maintenance option and when it should be performed based on actual conditions rather than time-based maintenance schedule. According to various embodiments, prescriptive analysis selects the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

The data insight layer 220 includes one or more components for time series databases (TDSB), relational/document databases, data lakes, blob, files, images, and videos, and/or an API for data query. According to various embodiments, when raw data is received at the IoT platform 125, the raw data is stored as time series tags or events in warm storage (e.g., in a TSDB) to support interactive queries and to cold storage for archive purposes. According to various embodiments, data is sent to the data lakes for offline analytics development. According to various embodiments, the data pipeline layer 215 accesses the data stored in the databases of the data insight layer 220 to perform analytics, as detailed above.

The application services layer 225 includes one or more components for rules engines, workflow/notifications, KPI framework, insights (e.g., actionable insights), decisions, recommendations, machine learning, and/or an API for application services. The application services layer 225 enables building of applications 146a-d. The applications layer 230 includes one or more applications 146a-d of the IoT platform 125. For example, according to various embodiments, the applications 146a-d includes a buildings application 146a, a plants application 146b, an aero application 146c, and other enterprise applications 146d. According to various embodiments, the applications 146 includes general applications 146 for portfolio management, asset management, autonomous control, and/or any other custom applications. According to various embodiments, portfolio management includes the KPI framework and a flexible user interface (UI) builder. According to various embodiments, asset management includes asset performance and asset health. According to various embodiments, autonomous control includes energy optimization and/or predictive maintenance. As detailed above, according to various embodiments, the general applications 146 is extensible such that each application 146 is configurable for the different types of enterprises 160a-160n (e.g., buildings application 146a, plants application 146b, aero application 146c, and other enterprise applications 146d).

The applications layer 230 also enables visualization of performance of the enterprise 160a-160n. For example, dashboards provide a high-level overview with drill downs to support deeper investigations. Recommendation summaries give users prioritized actions to address current or potential issues and opportunities. Data analysis tools support ad hoc data exploration to assist in troubleshooting and process improvement.

The core services layer 235 includes one or more services of the IoT platform 125. According to various embodiments, the core services 235 include data visualization, data analytics tools, security, scaling, and monitoring. According to various embodiments, the core services 235 also include services for tenant provisioning, single login/common portal, self-service admin, UI library/UI tiles, identity/access/ entitlements, logging/monitoring, usage metering, API gateway/dev portal, and the IoT platform 125 streams.

Figure 3:
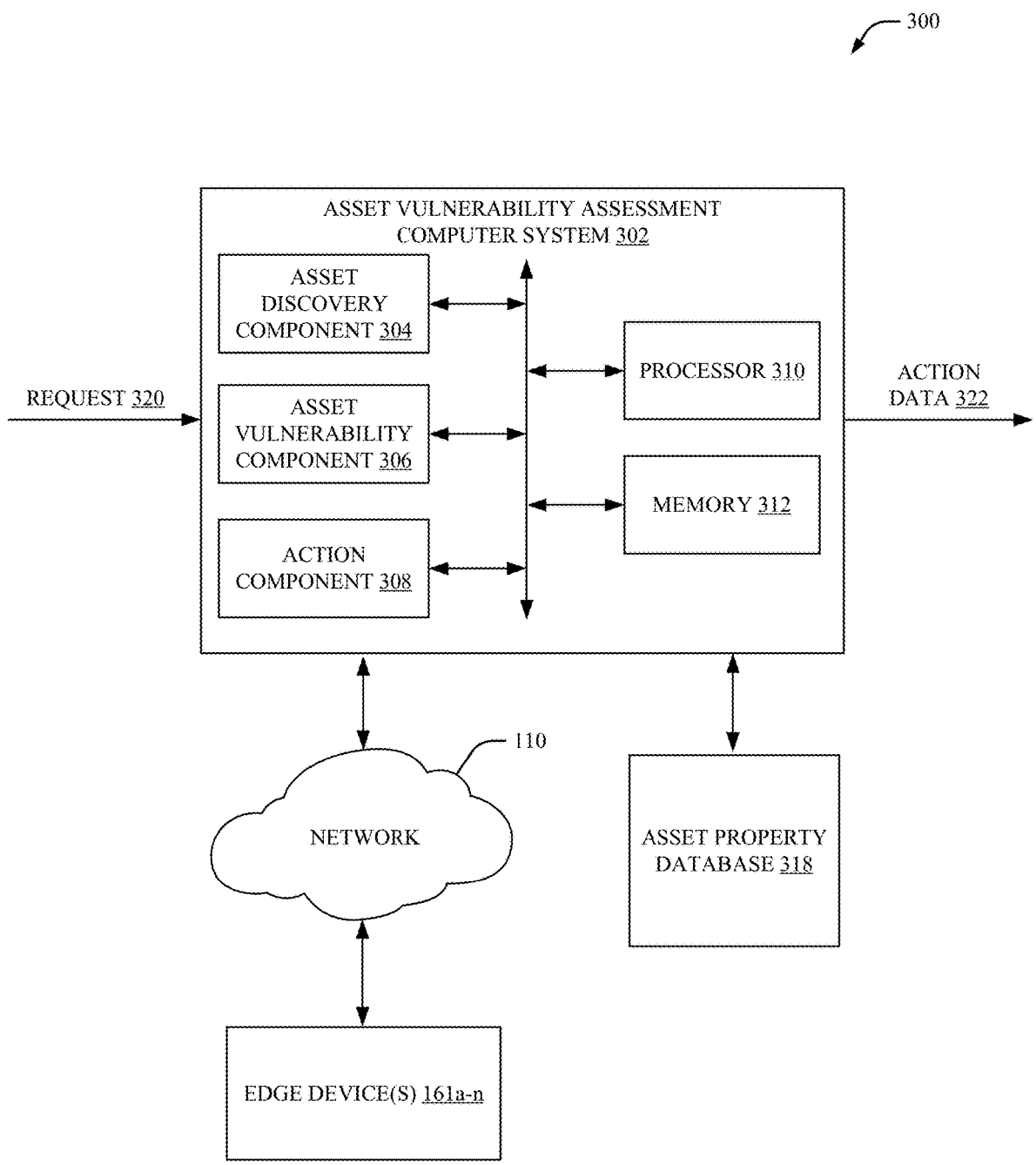
FIG. 3 illustrates a system that provides an exemplary environment, in accordance with one or more embodiments described herein.

FIG. 3 illustrates a system 300 that provides an exemplary environment according to one or more described features of one or more embodiments of the disclosure. According to an embodiment, the system 300 includes an asset vulnerability assessment computer system 302 to facilitate a practical application of asset vulnerability assessment with respect to assets within a network. In one or more embodiments, the asset vulnerability assessment computer system 302 facilitates a practical application of monitoring network traffic broadcasted to the assets and/or based on responses from the assets to facilitate asset vulnerability assessment with respect to assets within a network. In one or more embodiments, the asset vulnerability assessment computer system 302 stores and/or analyzes asset property data that is aggregated from one or more assets and/or one or more data sources associated with an enterprise system (e.g., a building system, an industrial system or another type of enterprise system).

In an embodiment, the asset vulnerability assessment computer system 302 is a server system (e.g., a server device) that facilitates asset vulnerability assessment with respect to assets within a network. In one or more embodiments, the asset vulnerability assessment computer system 302 is a device with one or more processors and a memory. In one or more embodiments, the asset vulnerability assessment computer system 302 is a computer system from the computer systems 120. For example, in one or more embodiments, the asset vulnerability assessment computer system 302 is implemented via the cloud 105. The asset vulnerability assessment computer system 302 is also related to one or more technologies, such as, for example, cybersecurity technologies, asset vulnerability assessment technologies, industrial technologies, process plant technologies, oil and gas technologies, petrochemical technologies, refinery technologies, process plant technologies, supply chain analytics technologies, enterprise technologies, connected building technologies, industrial technologies, Internet of Things (IoT) technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, aircraft technologies, navigation technologies, asset visualization technologies, procurement technologies, and/or one or more other technologies.

Moreover, the asset vulnerability assessment computer system 302 provides an improvement to one or more technologies such as cybersecurity technologies, asset vulnerability assessment technologies, industrial technologies, process plant technologies, oil and gas technologies, petrochemical technologies, refinery technologies, process plant technologies, supply chain analytics technologies, enterprise technologies, connected building technologies, industrial technologies, IoT technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, aircraft technologies, navigation technologies, asset visualization technologies, procurement technologies, and/or one or more other technologies. In an implementation, the asset vulnerability assessment computer system 302 improves performance of a computing device. For example, in one or more embodiments, the asset vulnerability assessment computer system 302 improves processing efficiency of a computing device (e.g., a server), reduces power consumption of a computing device (e.g., a server), improves quality of data provided by a computing device (e.g., a server), etc.

The asset vulnerability assessment computer system 302 includes a asset discovery component 304, an asset vulnerability component 306 and/or a action component 308. Additionally, in one or more embodiments, the asset vulnerability assessment computer system 302 includes a processor 310 and/or a memory 312. In certain embodiments, one or more aspects of the asset vulnerability assessment computer system 302 (and/or other systems, apparatuses and/or processes disclosed herein) constitute executable instructions embodied within a computer-readable storage medium (e.g., the memory 312). For instance, in an embodiment, the memory 312 stores computer executable component and/or executable instructions (e.g., program instructions). Furthermore, the processor 310 facilitates execution of the computer executable components and/or the executable instructions (e.g., the program instructions). In an example embodiment, the processor 310 is configured to execute instructions stored in the memory 312 or otherwise accessible to the processor 310.

The processor 310 is a hardware entity (e.g., physically embodied in circuitry) capable of performing operations according to one or more embodiments of the disclosure. Alternatively, in an embodiment where the processor 310 is embodied as an executor of software instructions, the software instructions configure the processor 310 to perform one or more algorithms and/or operations described herein in response to the software instructions being executed. In an embodiment, the processor 310 is a single core processor, a multi-core processor, multiple processors internal to the asset vulnerability assessment computer system 302, a remote processor (e.g., a processor implemented on a server), and/or a virtual machine. In certain embodiments, the processor 310 is in communication with the memory 312, the asset discovery component 304, the asset vulnerability component 306 and/or the action component 308 via a bus to, for example, facilitate transmission of data among the processor 310, the memory 312, the asset discovery component 304, the asset vulnerability component 306 and/or the action component 308. The processor 310 may be embodied in a number of different ways and, in certain embodiments, includes one or more processing devices configured to perform independently. Additionally or alternatively, in one or more embodiments, the processor 310 includes one or more processors configured in tandem via a bus to enable independent execution of instructions, pipelining of data, and/or multi-thread execution of instructions.

The memory 312 is non-transitory and includes, for example, one or more volatile memories and/or one or more non-volatile memories. In other words, in one or more embodiments, the memory 312 is an electronic storage device (e.g., a computer-readable storage medium). The memory 312 is configured to store information, data, content, one or more applications, one or more instructions, or the like, to enable the asset vulnerability assessment computer system 302 to carry out various functions in accordance with one or more embodiments disclosed herein. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor, circuitry, an executable component, a thread of instructions, a program, and/or a computer entity.

In an embodiment, the asset vulnerability assessment computer system 302 (e.g., the asset discovery component 304 of the asset vulnerability assessment computer system 302) determines asset property data related to the edge devices 161a-161n. In one or more embodiments, the edge devices 161a-161n are associated with a portfolio of assets. For instance, in one or more embodiments, the edge devices 161a-161n include one or more assets in a portfolio of assets. The edge devices 161a-161n include, in one or more embodiments, one or more databases, one or more assets (e.g., one or more industrial assets, one or more building assets, etc.), one or more IoT devices (e.g., one or more industrial IoT devices), one or more connected building assets, one or more sensors, one or more actuators, one or more processors, one or more computers, one or more valves, one or more pumps (e.g., one or more centrifugal pumps, etc.), one or more motors, one or more compressors, one or more turbines, one or more ducts, one or more heaters, one or more chillers, one or more coolers, one or more storage tanks, one or more boilers, one or more furnaces, one or more heat exchangers, one or more fans, one or more blowers, one or more conveyor belts, one or more vehicle components, one or more cameras, one or more displays, one or more security components, one or more HVAC components, industrial equipment, factory equipment, refinery equipment, and/or one or more other devices that are connected to the network 110 for collecting, sending, and/or receiving information. In one or more embodiments, the edge device 161a-161n include, or is otherwise in communication with, one or more controllers for selectively controlling a respective edge device 161a-161n and/or for sending/receiving information between the edge devices 161a-161n and the asset vulnerability assessment computer system 302 via the network 110. The asset property data includes, for example, an internet protocol (IP) address, a media access control (MAC) address, a hostname, a manufacturer, an operating system, a transmission control protocol (TCP) port, a user datagram protocol (UDP) port, a service, a role, metadata, flow flags, port status (e.g., open state, closed state, etc.), asset state, asset type, asset discovery information, and/or other information associated with one or more edge devices from the edge devices 161a-161n. In one or more embodiments, the asset property data is additionally or alternatively associated with one or more asset processes related to one or more edge devices from the edge devices 161a-161n. For example, in one or more embodiments, the asset property data additionally or alternatively includes data generated by one or more asset processes, data generated by one or more asset processes, and/or other data related to one or more asset processes.

In one or more embodiments, the asset vulnerability assessment computer system 302 (e.g., the asset discovery component 304 of the asset vulnerability assessment computer system 302) is in communication with the edge devices 161a-161n via the network 110. In one or more embodiments, the network 110 is a Wi-Fi network, a Near Field Communications (NFC) network, a Worldwide Interoperability for Microwave Access (WiMAX) network, a personal area network (PAN), a short-range wireless network (e.g., a Bluetooth® network), an infrared wireless (e.g., IrDA) network, an ultra-wideband (UWB) network, an induction wireless transmission network, and/or another type of network. In one or more embodiments, the edge devices 161a-161n are associated with an industrial environment (e.g., a plant, etc.). Additionally or alternatively, in one or more embodiments, the edge devices 161a-161n are associated with components of the edge 115 such as, for example, one or more enterprises 160a-160n.

The asset discovery component 304 is configured for asset discovery to detect one or more assets (e.g., the edge devices 161a-161n) within the network 110. For instance, the asset discovery component 304 is configured to perform one or more asset discovery processes associated with the network 110 to detect the one or more assets (e.g., the edge devices 161a-161n) within the network 110. In an embodiment, the asset discovery component 304 detects one or more assets within a certain IP range of the network 110. In one or more embodiments, the asset discovery component 304 also aggregates asset property data related to the one or more assets (within the network 110 to provide aggregated asset property data. For instance, in one or more embodiments, the asset discovery component 304 aggregates the asset property data into an asset property database 318 to store the aggregated asset property data. In an embodiment, the asset discovery component 304 performs the one or more asset discovery processes in response to an action (e.g., a user-initiated action, modification of an interactive graphical element, etc.) initiated via an electronic interface of a computing device associated with a user. In another embodiment, the asset discovery component 304 performs the one or more asset discovery processes in response to an action initiated in response to a timer (e.g., an asset schedule) satisfying a defined timer threshold value. For example, in certain embodiments, the asset discovery component 304 performs the one or more asset discovery processes based on a schedule (e.g., every 30 minutes, every hour, one or more times per day, one or more times per week, etc.). In one or more embodiments, the asset discovery component 304 performs the one or more asset discovery processes based on one or more performance requirements associated with the one or more assets within the network 110. For example, in one or more embodiments, the asset discovery component 304 performs the one or more asset discovery processes based on CPU requirements, memory requirements, a firmware version, and/or other performance requirements associated with the one or more assets within the network 110.

In one or more embodiments, the asset discovery component 304 performs the one or more asset discovery processes with respect to one or more assets in a Level 0 (e.g., zone 0) of the network 110, a Level 1 (e.g., zone 1) of the network 110, and/or a Level 2 (e.g., zone 2) of the network 110. In one or more embodiments, a Level 0 (e.g., zone 0) of the network 110 includes field instrumentation assets associated with technical parameters such as, for example, firmware version/revision, tag name, sensor type, status, manufacturer, communication type, and/or other information. Additionally, a Level 1 (e.g., zone 1) of the network 110 includes embedded IOM's and controllers associated with parameters such as, for example, firmware version/revision, module type, synchronization status, manufacturer, module status, performance data (e.g., CPU performance, memory performance, etc.), and/or other information. Additionally, a Level 1 (e.g., zone 1) of the network 110 includes supervisory/application/network switches nodes asset report associated with parameters such as, for example, model, type, manufacturer, IOS type, mirror port information, up/down ports, memory, CPU, operating system, open TCP, UDP ports, and/or other information.

In one or more embodiments, the asset discovery component 304 generates the aggregated asset property data by monitoring network traffic broadcasted to the one or more assets. Additionally or alternatively, the asset discovery component 304 generates the aggregated asset property data based on one or more communications broadcasted by the one or more assets. In one or more embodiments, the asset discovery component 304 generates the aggregated asset property data by scanning, based on one or more data acquisition protocols associated with the one or more assets, one or more ports (e.g., one or more TCP ports, one or more UDP ports, etc.) of the one or more assets.

In one or more embodiments, the asset vulnerability assessment computer system 302 (e.g., the asset vulnerability component 306 of the asset vulnerability assessment computer system 302) receives a request 320 to perform an asset vulnerability assessment of the one or more assets within the network 110. In one or more embodiments, the request 320 includes one or more asset descriptors that describe the one or more assets. For instance, in one or more embodiments, the request 320 includes one or more asset descriptors that describe the edge devices 161a-161n. An asset descriptor includes, for example, an asset name, an asset identifier, an asset level, an IP address, a MAC address, a hostname, a manufacturer, an operating system identifier, a TCP port identifier, a UDP port identifier, a service identifier, a role identifier, metadata, an asset state, asset discovery information, a sensor identifier, and/or other information associated with the one or more assets. In one or more embodiments, the request 320 includes a request to generate a dashboard visualization associated with the asset vulnerability assessment. In one or more embodiments, the request 320 is received in response to an action (e.g., a user-initiated action, modification of an interactive graphical element, etc.) initiated via an electronic interface of a computing device. In one or more embodiments, the request 320 is received in response to an action initiated via a processing unit (e.g., an edge device, a controller, etc.) associated with the one or more assets. In one or more embodiments, the request 320 is received in response to an asset schedule satisfying a defined criterion (e.g., an asset schedule interval being above a threshold timer). In one or more embodiments, the request 320 is received in response to detection of a possible anomaly associated with an asset (e.g., in response to an anomaly index for an asset being greater than a specified threshold level). Additionally or alternatively, in one or more embodiments, the request 320 includes one or more user identifiers describing a user role for a user associated with access of a dashboard visualization. A user identifier includes, for example, an identifier for a user role name (e.g., a manager, an executive, a maintenance engineer, a process engineer, etc.).

In response to the request 320, the asset vulnerability component 306 obtains aggregated asset property data associated with the one or more assets. For example, in one or more embodiments, the asset vulnerability component 306 obtains the aggregated asset property data from the asset property database 318. The aggregated asset property data includes, for example, aggregated IP addresses, aggregated MAC addresses, aggregated hostname data, aggregated manufacturer data, aggregated operating system data, aggregated TCP port data, aggregated UDP port data, aggregated service data, aggregated role data, aggregated metadata, aggregated flow flags data, aggregated port status data (e.g., aggregated open state data, aggregated closed state data, etc.), aggregated asset state data, aggregated asset type data, aggregated asset discovery information, and/or other aggregated information associated with one or more edge devices from the edge devices 161a-161n Additionally, the asset vulnerability component 306 performs the asset vulnerability assessment based on the aggregated asset property data and asset vulnerability signature data stored in an asset vulnerability signature repository. For instance, the asset vulnerability component 306 determines whether the asset vulnerability component 306 satisfies a defined criterion based on a comparison between the aggregated asset property data and asset vulnerability signature data. The asset vulnerability signature data includes, for example, one or more data signatures (e.g., one or more digital patterns, one or more digital fingerprints, etc.) that correspond to one or more asset vulnerability events and/or one or more asset vulnerability patterns. In an embodiment, at least a portion of the asset vulnerability signature data is stored in the asset property database 318. Additionally or alternatively, at least a portion of the asset vulnerability signature data is stored in an asset vulnerability signature repository associated with the asset property database 318 and/or another database (e.g., the memory 312, etc.). In one or more embodiments, the asset vulnerability component 306 compares one or more portions of the aggregated asset property data to one or more portions of the asset vulnerability signature data. In response to a match, the asset vulnerability component 306 can determine that a vulnerability exists for an asset.

In one or more embodiments, in response to determining that the asset vulnerability assessment satisfies a defined criterion (e.g., in response to a match), the action component 308 performs one or more actions associated with the network 110. For instance, in response to determining that the asset vulnerability assessment satisfies a defined criterion (e.g., in response to a match), the action component 308 generates action data 322 to facilitate the one or more actions associated with the network 110.

In one or more embodiments, the asset vulnerability component 306 determines respective risk scores for the assets based on the cybersecurity vulnerability assessment. Furthermore, based on a risk score, the action component 308 performs a predetermined action such as a predetermined action associated with security control. In an embodiment, an action includes altering an administrative control with respect to an asset, altering a policy with respect to an asset, alter a configuration setting with respect to an asset, disconnecting a physical hardware device associated with an asset from a network, increasing a degree of monitoring with respect to an asset, altering strength of authentication with respect to an asset, altering a communication channel associated with an asset, and/or one or more other types of actions with respect to an asset.

In an embodiment, an action includes generating a report associated with the asset vulnerability assessment. In another embodiment, an action includes generating a user-interactive electronic interface that renders a visual representation of data associated with the o asset vulnerability assessment. In another embodiment, an action includes disconnecting one or more assets from the network 110. In another embodiment, an action from the one or more actions includes providing one or more recommended actions for one or more assets based on the asset vulnerability assessment. In another embodiment, an action from the one or more actions includes transmitting, to a computing device, one or more notifications associated with the asset vulnerability assessment. In another embodiment, an action from the one or more actions includes altering one or more portions of the network 110 based on the asset vulnerability assessment. In another embodiment, an action from the one or more actions includes providing an optimal process condition for an asset based on the asset vulnerability assessment. For example, in another embodiment, an action from the one or more actions includes adjusting a set-point and/or a schedule for an asset based on the asset vulnerability assessment. In another embodiment, an action from the one or more actions includes one or more corrective actions to take for an asset based on the asset vulnerability assessment. In another embodiment, an action from the one or more actions includes providing an optimal maintenance option for an asset based on the asset vulnerability assessment. In another embodiment, an action from the one or more actions includes an action associated with the application services layer 225, the applications layer 230, and/or the core services layer 235 based on the asset vulnerability assessment. In certain embodiments, the action component 308 provides a dashboard visualization to an electronic interface of a computing device based on the asset vulnerability assessment. In one or more embodiments, the dashboard visualization includes data associated with the asset vulnerability assessment. In one or more embodiments, the dashboard visualization includes one or more metrics associated with the asset vulnerability assessment. In certain embodiments, an action from the one or more actions includes configuring the dashboard visualization (e.g., based on the asset vulnerability assessment) to provide individual control of the one or more assets via the dashboard visualization. In certain embodiments, an action from the one or more actions includes configuring the dashboard visualization (e.g., based on the asset vulnerability assessment) to facilitate creation of one or more work orders for the one or more assets.

Figure 4:
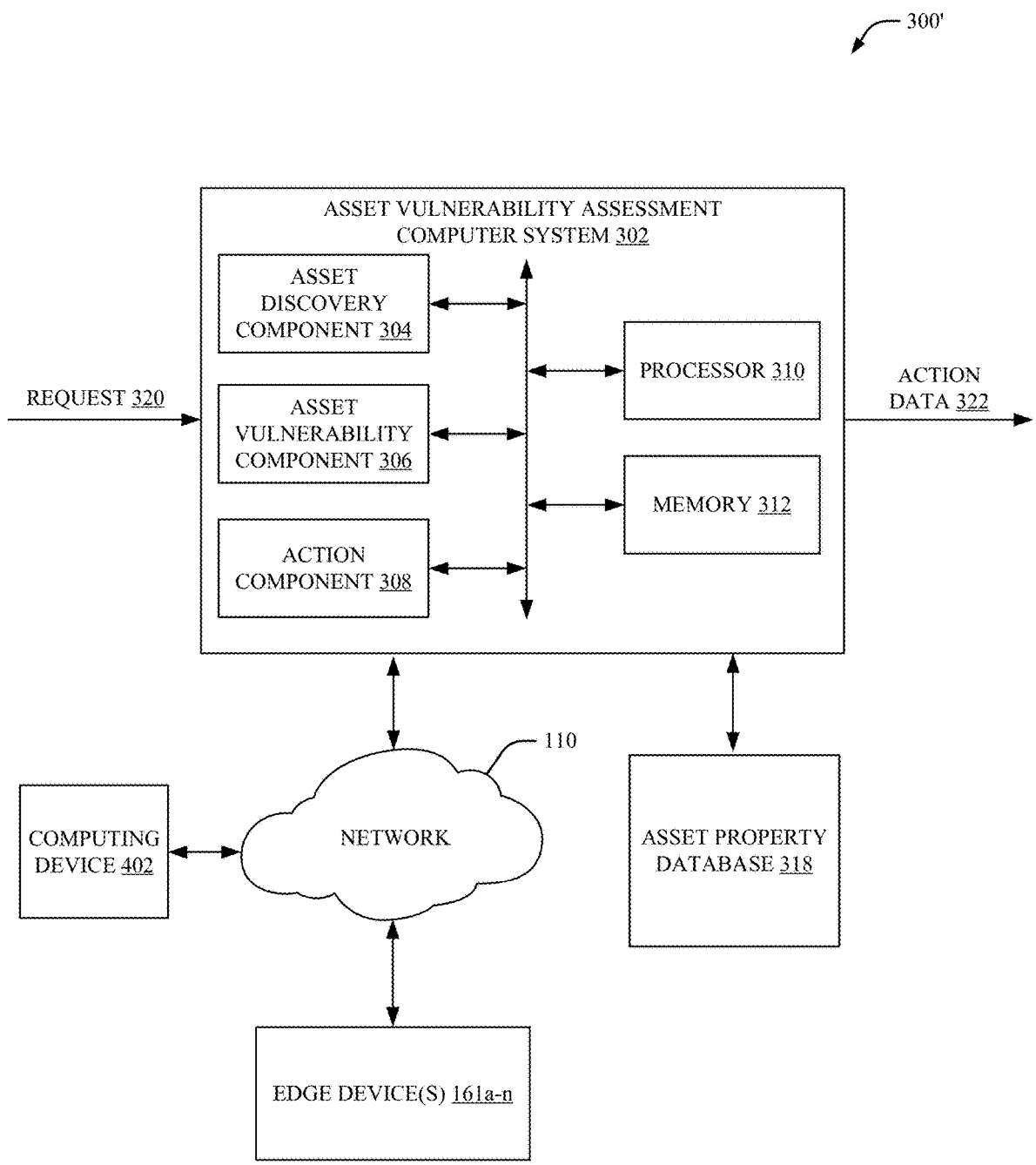
FIG. 4 illustrates another system that provides an exemplary environment, in accordance with one or more embodiments described herein.

FIG. 4 illustrates a system 300' that provides an exemplary environment according to one or more described features of one or more embodiments of the disclosure. In an embodiment, the system 300' corresponds to an alternate embodiment of the system 400 shown in FIG. 4. According to an embodiment, the system 300' includes the asset vulnerability assessment computer system 302, the edge devices 161a-161n, the asset property database 318 and/or a computing device 402. In one or more embodiments, the asset vulnerability assessment computer system 302 is in communication with the edge devices 161a-161n and/or the computing device 402 via the network 110. The computing device 402 is a mobile computing device, a smartphone, a tablet computer, a mobile computer, a desktop computer, a laptop computer, a workstation computer, a wearable device, a virtual reality device, an augmented reality device, or another type of computing device located remote from the asset vulnerability assessment computer system 302.

In one or more embodiments, the action component 308 communicates one or more portions of the action data 322 to the computing device 402. For example, in one or more embodiments, the action data 322 includes one or more visual elements for a visual display (e.g., a user-interactive electronic interface) of the computing device 402 that renders a visual representation of the data associated with the asset vulnerability assessment. In certain embodiments, the visual display of the computing device 402 displays one or more graphical elements associated with the action data 322 (e.g., the data associated with the asset vulnerability assessment). In another example, in one or more embodiments, the action data 322 includes one or notifications associated with the asset vulnerability assessment. In one or more embodiments, the action data 322 allows a user associated with the computing device 402 to make decisions and/or perform one or more actions with respect to the asset vulnerability assessment. In one or more embodiments, the action data 322 allows a user associated with the computing device 402 to control the one or more portions of the one or more assets (e.g., one or more portions of the edge devices 161a-161n). In one or more embodiments, the action data 322 allows a user associated with the computing device 402 to generate one or more work orders for the one or more assets. In one or more embodiments, the action data 322 provides a report associated with the asset vulnerability assessment via a display of the computing device 402.

Figure 5:
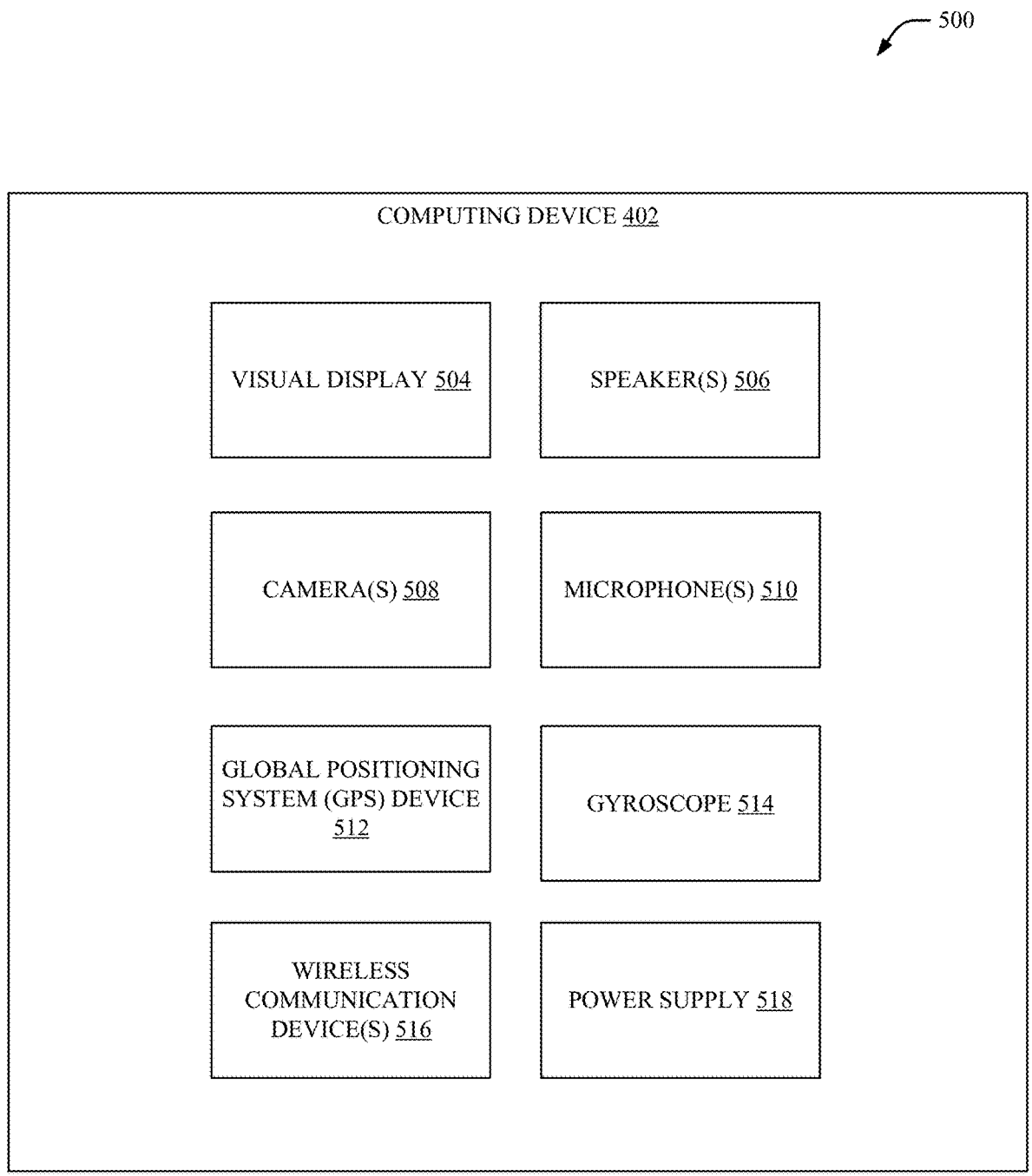
FIG. 5 illustrates an exemplary computing device, in accordance with one or more embodiments described herein.

FIG. 5 illustrates a system 500 according to one or more embodiments of the disclosure. The system 500 includes the computing device 402. In one or more embodiments, the computing device 402 employs mobile computing, augmented reality, cloud-based computing, IoT technology and/or one or more other technologies to provide performance data, video, audio, text, graphs, charts, real-time data, graphical data, one or more communications, one or more messages, one or more notifications, and/or other media data associated with the one or more metrics. The computing device 402 includes mechanical components, electrical components, hardware components and/or software components to facilitate determining prioritized actions and/or one or more metrics associated with the asset data 314. In the embodiment shown in FIG. 5, the computing device 402 includes a visual display 504, one or more speakers 506, one or more cameras 508, one or more microphones 510, a global positioning system (GPS) device 512, a gyroscope 514, one or more wireless communication devices 516, and/or a power supply 518.

In an embodiment, the visual display 504 is a display that facilitates presentation and/or interaction with one or more portions of the action data 322. In one or more embodiments, the computing device 402 displays an electronic interface (e.g., a graphical user interface) associated with an asset performance management platform. In one or more embodiments, the visual display 504 is a visual display that renders one or more interactive media elements via a set of pixels. The one or more speakers 506 include one or more integrated speakers that project audio. The one or more cameras 508 include one or more cameras that employ autofocus and/or image stabilization for photo capture and/or real-time video. The one or more microphones 510 include one or more digital microphones that employ active noise cancellation to capture audio data. The GPS device 512 provides a geographic location for the computing device 402. The gyroscope 514 provides an orientation for the computing device 402. The one or more wireless communication devices 516 includes one or more hardware components to provide wireless communication via one or more wireless networking technologies and/or one or more short-wavelength wireless technologies. The power supply 518 is, for example, a power supply and/or a rechargeable battery that provides power to the visual display 504, the one or more speakers 506, the one or more cameras 508, the one or more microphones 510, the GPS device 512, the gyroscope 514, and/or the one or more wireless communication devices 516. In certain embodiments, the action data 322 associated with the prioritized actions and/or the one or more metrics is presented via the visual display 504 and/or the one or more speakers 506.

Figure 6:
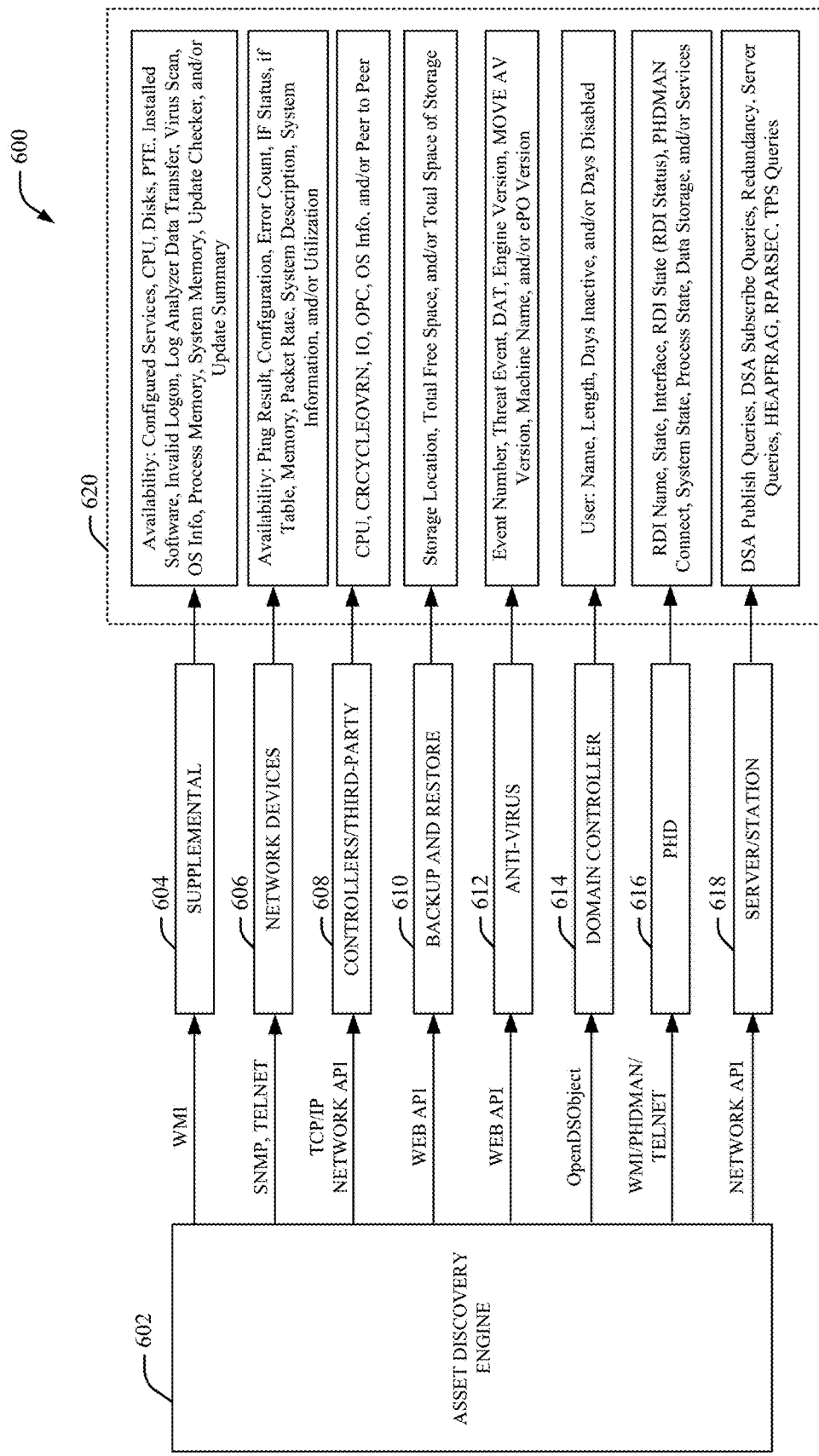
FIG. 6 illustrates an exemplary system associated with an asset discovery engine, in accordance with one or more embodiments described herein.

FIG. 6 illustrates a system 600 according to one or more embodiments of the disclosure. The system 600 includes an asset discovery engine 602. The asset discovery engine 602 is, for example, an asset discovery engine of the asset discovery component 304. In one or more embodiments, the asset discovery engine 602 is configured to detect one or more assets in the network 110 such as, for example, one or more supplemental assets 604, one or more network device assets 606, one or more controller assets 608 (e.g., one or more third-party controller assets), one or more backup and restore assets 610, one or more antivirus assets 612, one or more domain controller assets 614, one or more process history database (PHD) assets 616, and/or one or more server/station assets 618. In one or more embodiments, the asset discovery engine 602 is configured to discover one or more assets within a Level 3 (e.g., zone 2) of the network 110. In one or more embodiments, the asset discovery engine 602 is configured to discover the one or more networks via an application programming interface associated with an asset, a management instrumentation associated with an asset, a network management protocol associated with an asset, an application protocol associated with an asset, a network port associated with an asset, a transmission control protocol associated with an asset, and/or another network component associated with an asset. In one or more embodiments, based on the one or more assets discovered by the asset discovery engine 602, the asset discovery engine 602 determines asset property data 620. The asset property data 620 includes information such as, for example, availability, configured services, CPU information, storage information, installed software information, log analyzer information, data transfer information, virus scan information, operation system information, process information, memory information, update checker information, update summary information, ping result information, configuration information, error count, logic information, packet rate, system information, system description, utilization information, storage location, total free space, event number, threat event information, machine name, user name, activation information, disablement information, interface information, process state, query information, and/or other information.

Figure 7:
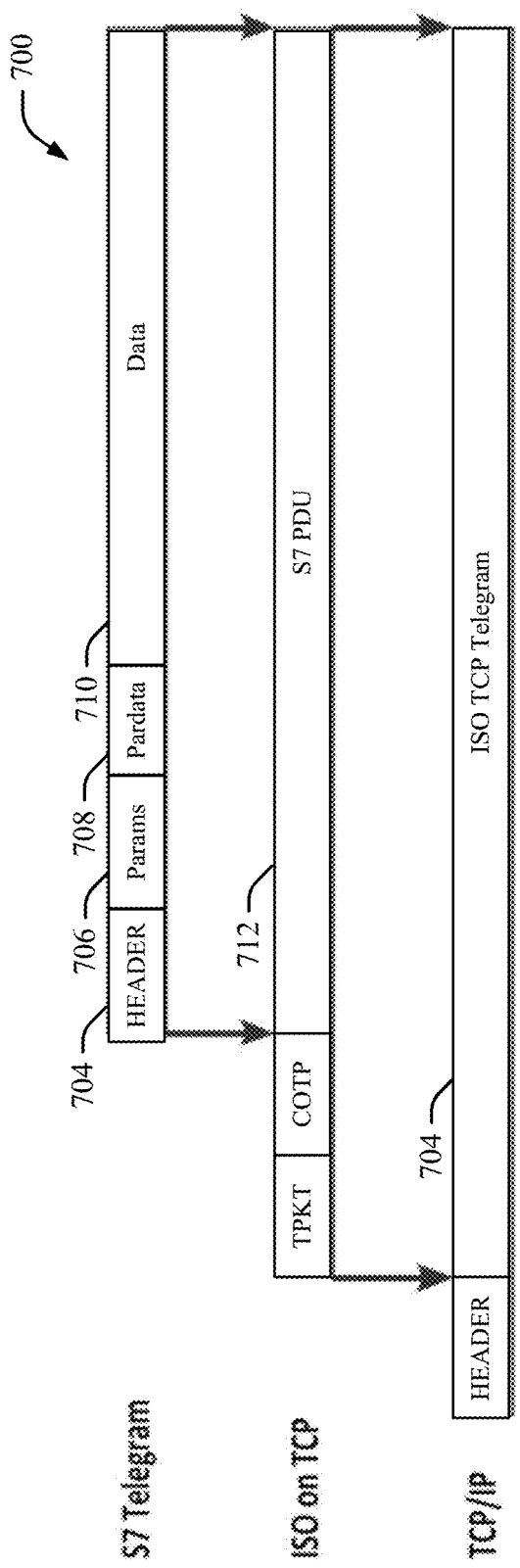
FIG. 7 illustrates an exemplary data packet, in accordance with one or more embodiments described herein.

FIG. 7 illustrates a data packet 700 according to one or more embodiments of the disclosure. In one or more embodiments, the asset discovery engine 602 determine at least a portion of the asset property data 620 by monitoring and/or analyzing the data packet 700. In an embodiment, the data packet 700 includes a header 704, a set of parameters 706, parameter data 708, and/or a data block 710. In certain embodiments, the data packet 700 is configured as an S7 telegram associated with an S7 protocol. In certain embodiments, the header 704, the set of parameters 706, the parameter data 708, and/or the data block 710 are encoded within a protocol data unit (PDU) data block 712 of a TCP data packet. In certain embodiments, the header 704, the set of parameters 706, the parameter data 708, and/or the data block 710 are additionally or alternatively encoded within an ISO TCP data block 712 of a TCP/IP data packet.

Figure 8:
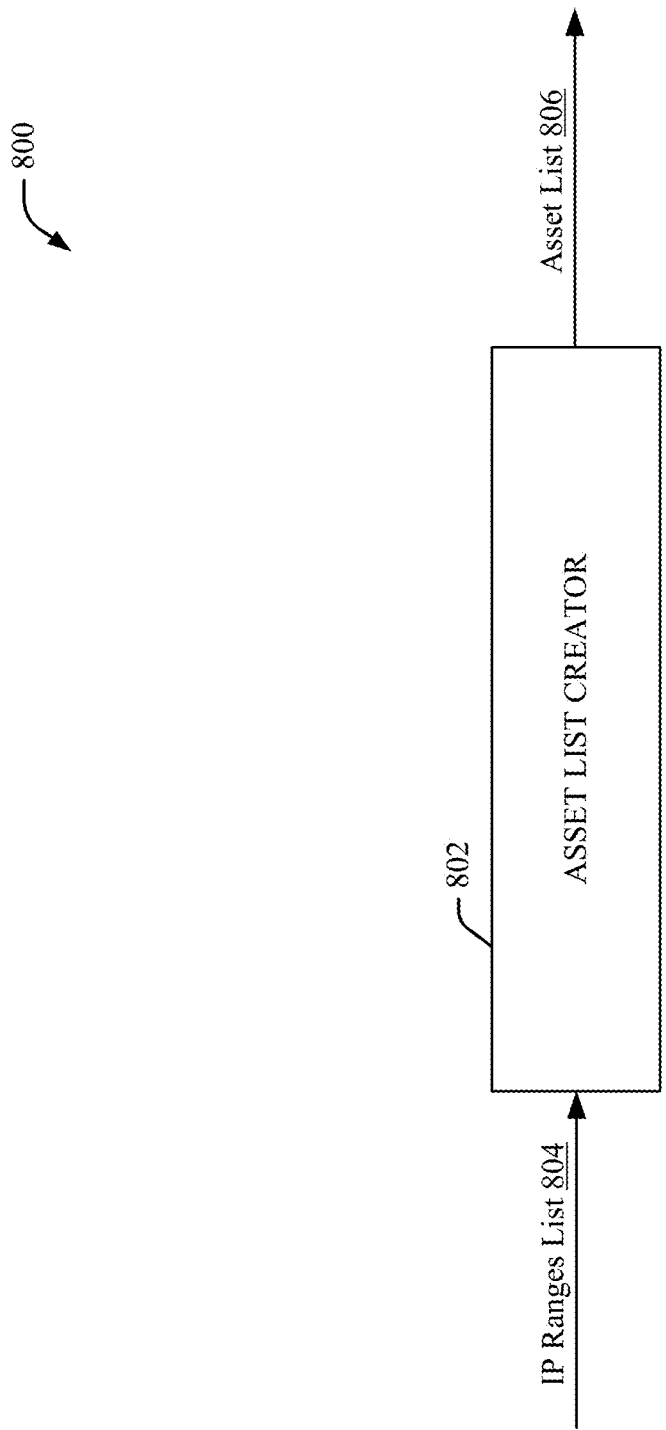
FIG. 8 illustrates an exemplary system associated with an asset list creator, in accordance with one or more embodiments described herein.

FIG. 8 illustrates a system 800 according to one or more embodiments of the disclosure. The system 800 includes an asset list creator 802. In one or more embodiments, the asset discovery engine 602 and/or the asset discovery component 304 includes the asset list creator 802. The asset list creator 802 is configured to convert an IP ranges list 804 into an asset list 806. For example, in one or more embodiments, the asset discovery engine 602 (e.g., the asset discovery component 304) employs the IP ranges list 804 to scan one or more IP ranges of the network 110 and to discover one or more assets in the one or more IP ranges. The asset list 806 includes, for example, the one or more assets discovered in the one or more IP ranges. In one or more embodiments, at least a portion of the IP ranges list 804 is provided by a user (e.g., via the electronic interface associated with the visual display 504 of the computing device 402).

Figure 9:
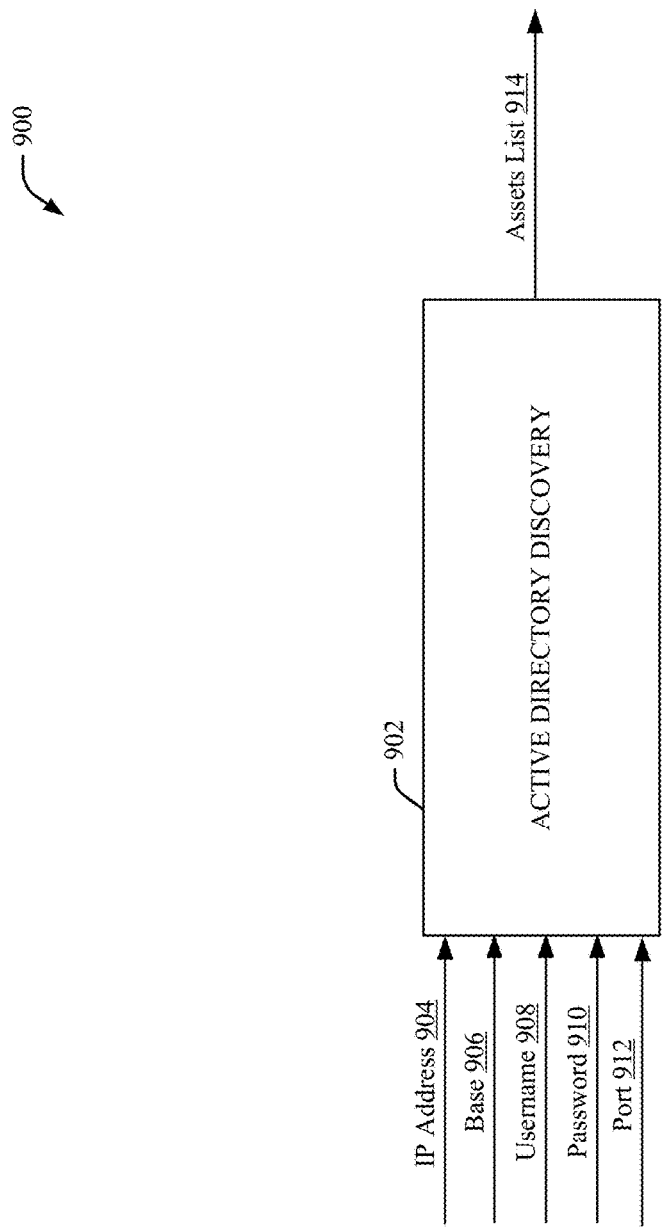
FIG. 9 illustrates an exemplary system associated with active directory discovery, in accordance with one or more embodiments described herein.

FIG. 9 illustrates a system 900 according to one or more embodiments of the disclosure. The system 900 includes active directory discovery 902. In one or more embodiments, the asset discovery engine 602 and/or the asset discovery component 304 includes the active directory discovery 902. The active directory discovery 902 is configured to determine information associated with assets using an active directory protocol and/or a lightweight directory access protocol. For example, in one or more embodiments, the active directory discovery 902 employs an IP address 904, a base 906, a username 908, a password 910, and/or a port 912 to determines an assets list 914. The assets list 914 includes, in certain embodiments, a hostname, an IP address, an operating system, and/or other information associated with respective assets.

Figure 10:
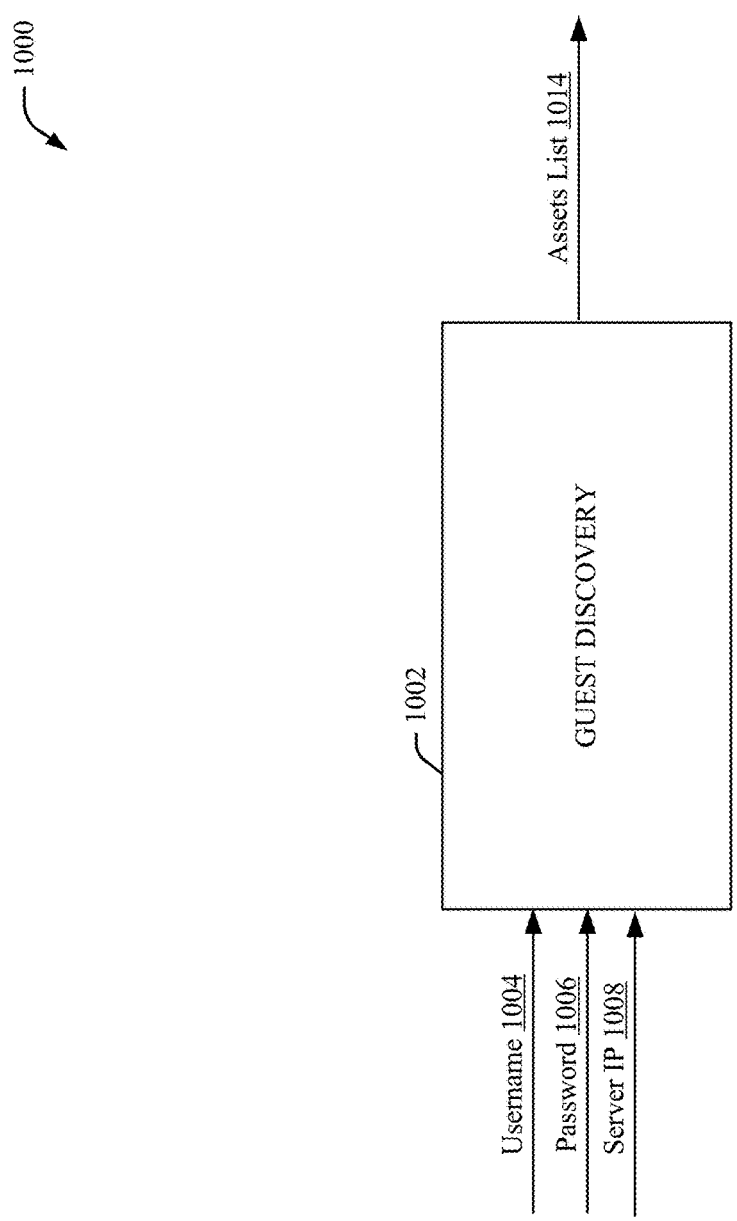
FIG. 10 illustrates an exemplary system associated with guest discovery, in accordance with one or more embodiments described herein.

FIG. 10 illustrates a system 1000 according to one or more embodiments of the disclosure. The system 1000 includes guest discovery 1002. In one or more embodiments, the asset discovery engine 602 and/or the asset discovery component 304 includes the guest discovery 1002. The guest discovery 1002 is configured to determine information associated with assets using a centralized server. For example, in one or more embodiments, the guest discovery 1002 employs a username 1004, a password 1006, and/or a server IP 1008 to determines an assets list 1014. The assets list 1014 includes, in certain embodiments, a hostname, an IP address, an operating system, and/or other information associated with respective assets.

Figure 11:
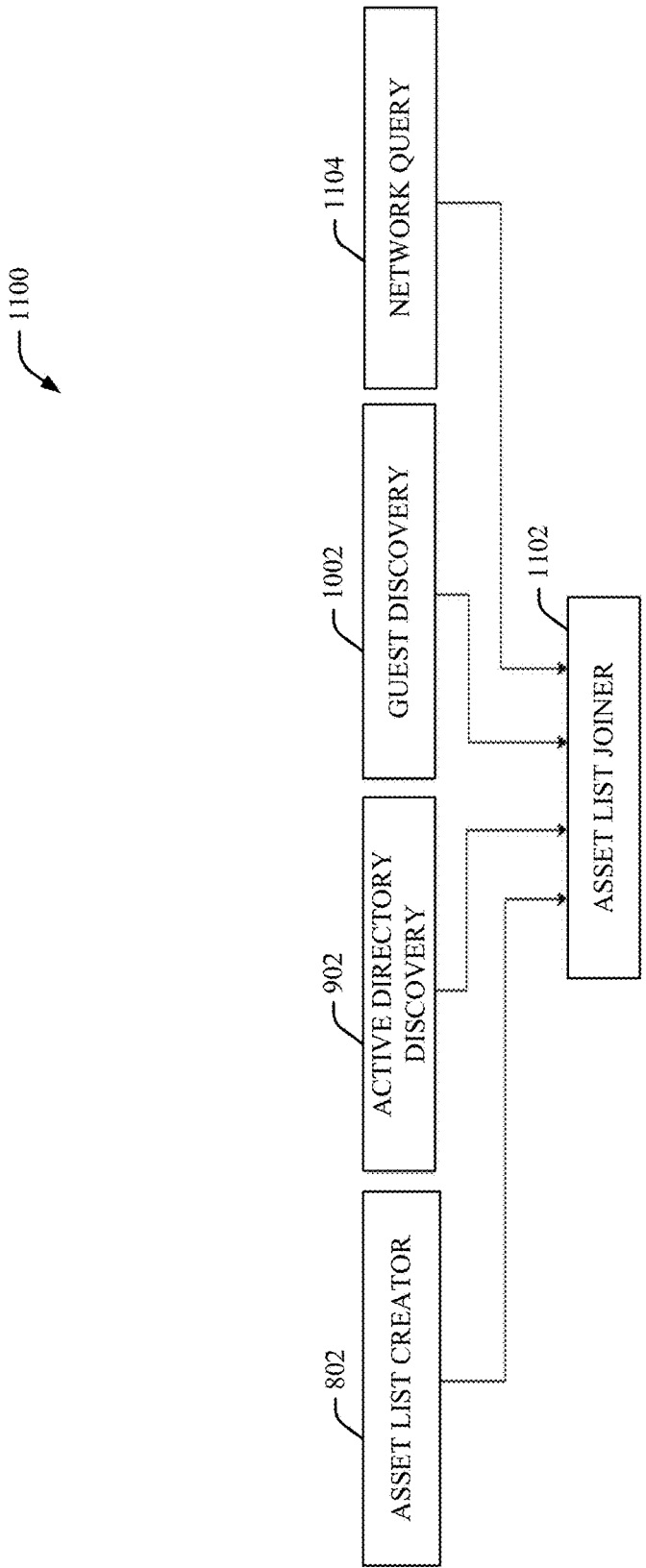
FIG. 11 illustrates an exemplary system associated with an asset list joiner, in accordance with one or more embodiments described herein.

FIG. 11 illustrates a system 1100 according to one or more embodiments of the disclosure. The system 1100 includes an asset list joiner 1102. In one or more embodiments, the asset discovery engine 602 and/or the asset discovery component 304 includes the asset list joiner 1102. In one or more embodiments, the asset list joiner 1102 aggregates asset information (e.g., assets lists, asset property data, etc.) from the asset list creator 802, the active directory discovery 902, the guest discovery 1002, and/or a network query 1104. In an embodiment, the network query 1104 corresponds to a query of the network 110 to discover one or more assets.

In one or more embodiments, the asset list joiner 1102 acquires lists of assets and combines lists of assets into an aggregated list of assets. In an embodiment, the asset list joiner 1102 combines lists of assets into an aggregated list of assets based on a unique identifier for respective assets. In an embodiment, the unique identifier corresponds to at least a portion of an IP address and/or a MAC address of an asset. In certain embodiments where multiple assets include a corresponding unique identifier, the asset list joiner 1102 combines the respective asset information into a single entry for the aggregated list of assets. In an exemplary embodiment, an aggregated list of assets corresponds to the following data structure:

| Data Type | | Active Directory Discovery | Guest Discovery | Host Discovery | Port Scanner | Data Query | Network Signature Matching | Role Detector |
|---|---|---|---|---|---|---|---|---|
| Hostname | String | ✓ | ✓ | | | | ✓ | |
| Vendor | String | | | ✓ | | | | |
| IP | String | ✓ | | ✓ | ✓ | | | |
| MAC | String | | | ✓ | ✓ | | | |
| TCP | Set | | | | | ✓ | | |
| UDP | Set | | | | | ✓ | | |
| OS | String | ✓ | ✓ | | | | ✓ | ✓ |
| Services | Set | | | | | | ✓ | |
| Role | String | | | | | | ✓ | ✓ |

Figure 12:
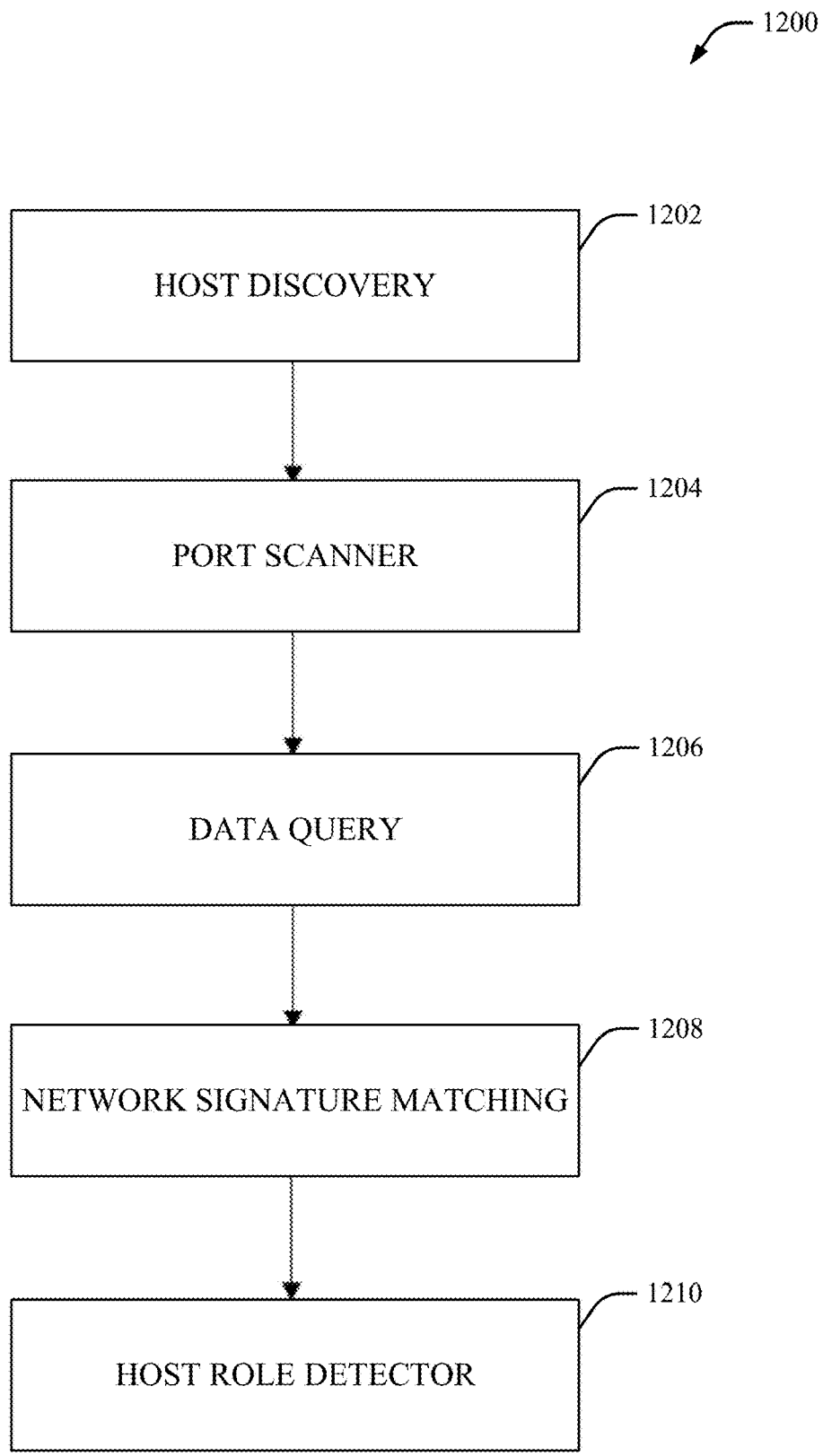
FIG. 12 illustrates an exemplary discovery process, in accordance with one or more embodiments described herein.

FIG. 12 illustrates a discovery process 1200 according to one or more embodiments of the disclosure. The discovery process 1200 is performed, for example, by the asset discovery engine 602 and/or the asset discovery component 304. The discovery process 1200 includes host discovery 1202, port scanner 1204, data query 1206, network signature matching 1208, and/or host role detector 1210. In one or more embodiments, the host discovery 1202, the port scanner 1204, the data query 1206, the network signature matching 1208, and/or the host role detector 1210 are performed to facilitate acquiring asset property data for the respective assets. A host is, for example, an asset within the network 110.

Figure 13:
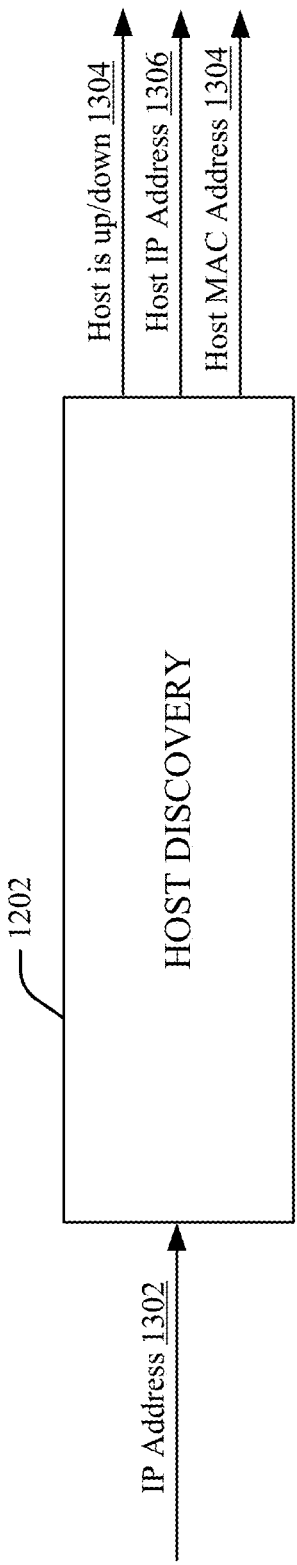
FIG. 13 illustrates an exemplary host discovery, in accordance with one or more embodiments described herein.

FIG. 13 illustrates the host discovery 1202 according to one or more embodiments of the disclosure. In one or more embodiments, the asset discovery engine 602 and/or the asset discovery component 304 includes the host discovery 1202. In one or more embodiments, the host discovery 1202 is configured to detect whether a given IP represents an active host (e.g., an asset within the network 110). For example, in one or more embodiments, the host discovery 1202 receives an IP address 1302 and, based on the IP address 1302, the host discovery 1202 determines whether the host is active (e.g., host is up/down 1304) and/or determines an IP address of the host (e.g., host IP address 1306). In certain embodiments, if the IP address 1302 is determined to be a part of a network for a server (e.g., a LAN of the server), the host discovery 1202 additionally determines a MAC address of the host (e.g., host MAC address 1308). In one or more embodiments, the host discovery 1202 employs one or more host discovery techniques such as, for example, ICMP ping, TCP SYN discovery, TCP ACK discovery, ICMP timestamp ping, ARP ping, and/or another type of host discovery technique.

Figure 14:
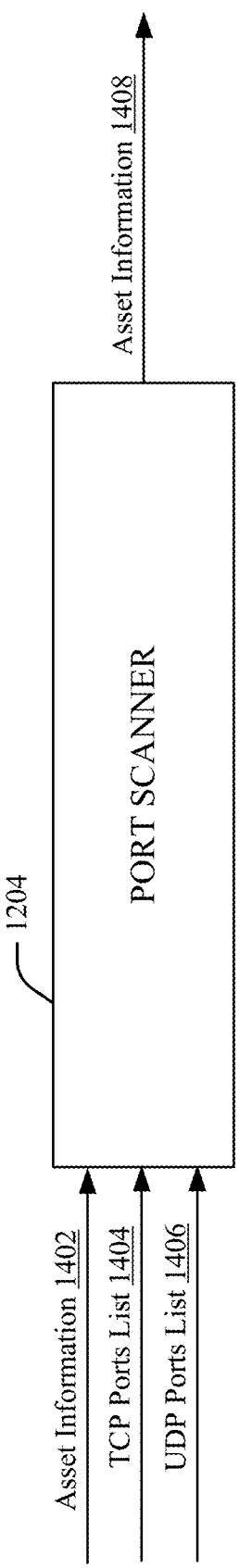
FIG. 14 illustrates an exemplary port scanner, in accordance with one or more embodiments described herein.

FIG. 14 illustrates the port scanner 1204 according to one or more embodiments of the disclosure. In one or more embodiments, the asset discovery engine 602 and/or the asset discovery component 304 includes the port scanner 1204. In one or more embodiments, the port scanner 1204 is configured to examine a port state (e.g., a TCP port state and/or a UDP port state) of an asset (e.g., an asset within the network 110). In one or more embodiments, the port scanner 1204 receives asset information 1402, a TCP ports list 1404, and/or a UDP ports list 1406. In an embodiment, the asset information 1402 is provided by the host discovery 1202. In response to the asset information 1402, the TCP ports list 1404, and/or the UDP ports list 1406, the port scanner 1204 provides asset information 1408 related to assets with open ports.

Figure 15:
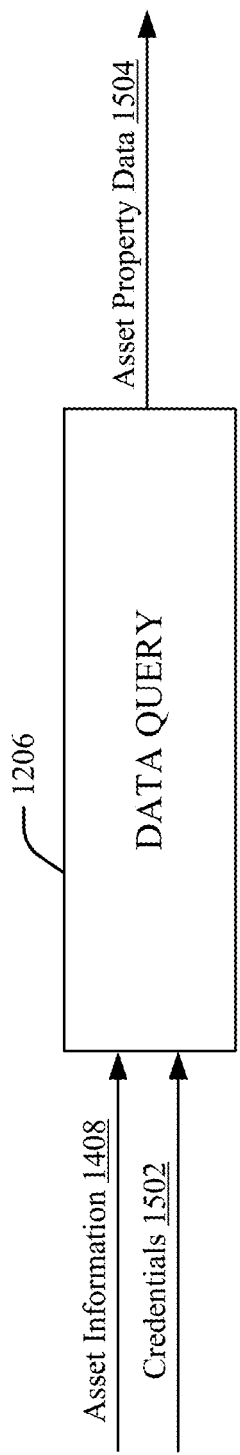
FIG. 15 illustrates an exemplary data query, in accordance with one or more embodiments described herein.

FIG. 15 illustrates the data query 1206 according to one or more embodiments of the disclosure. In one or more embodiments, the asset discovery engine 602 and/or the asset discovery component 304 includes the data query 1206. In one or more embodiments, the data query 1206 employs connection-based protocols (e.g., WMI, SSH, etc.) and/or connection-less protocols (e.g., SNMP, NBNS, etc.) to remotely query one or more assets for asset property data 1504 such as, for example, an IP address, a MAC address, a hostname, a manufacturer, an operating system, a TCP port, a UDP port, a service, a role, metadata, flow flags, port status (e.g., open state, closed state, etc.), asset type, asset state, asset discovery information, and/or other information associated with the one or more assets. The data query 1206 determines the one or assets for the query, for example, based on the asset information 1408. In certain embodiments, the data query 1206 performs the query with respect to the one or more assets in response to an authentication process associated with a user. For example, in certain embodiments, the data query 1206 employs credentials 1502 associated with a user to initiate the query with respect to the one or more assets. In one or more embodiments, the data query 1206 executes connection attempts using a specific protocol and/or based on open ports identified by the port scanner 1204. In one or more embodiments, the data query 1206 performs the query with respect to the one or more assets based on information related to one or more services executed via the one or more assets and/or one or more computing devices in communication with the one or more assets.

Figure 16:
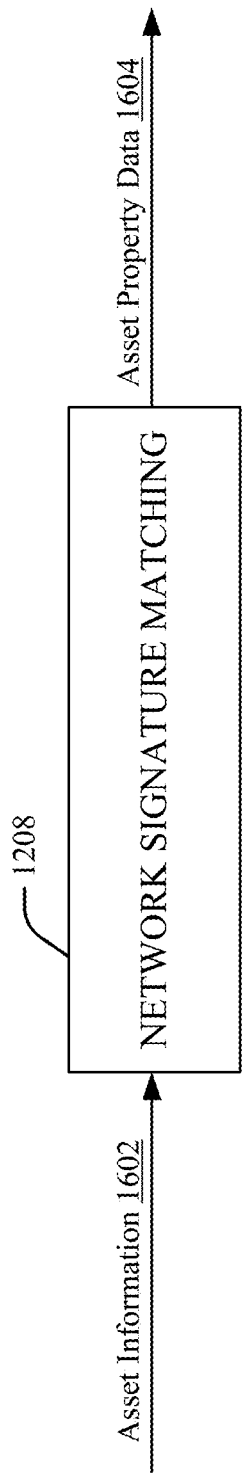
FIG. 16 illustrates exemplary network signature matching, in accordance with one or more embodiments described herein.

FIG. 16 illustrates the network signature matching 1208 according to one or more embodiments of the disclosure. In one or more embodiments, the asset discovery engine 602, the asset discovery component 304, and/or the asset vulnerability component 306 includes the network signature matching 1208. In one or more embodiments, the network signature matching 1208 is configured to process one or more assets that did not pass the data querying associated with the data query 1206. For example, in one or more embodiments, the network signature matching 1208 is configured to process one or more assets in which the data query 1206 was not able to connect to and/or query to obtain meaning the data query step was unable to connect to and/or was unable to query for asset property data (e.g., due to reasons such as wrong credentials, a connection protocol being not supported, etc.). In one or more embodiments, the network signature matching 1208 employs asset information 1602 associated with the one or more assets that did not pass the data querying to determine asset property data 1604 such as, for example, an IP address, a MAC address, a hostname, a manufacturer, an operating system, a TCP port, a UDP port, a service, a role, metadata, flow flags, port status (e.g., open state, closed state, etc.), asset type, asset state, asset discovery information, and/or other information associated with the one or more assets. Additionally or alternatively, in one or more embodiments, the network signature matching 1208 examines other characteristics related to network communication provided by and/or received by one or more assets in the network 110 to determine at least a portion of the asset property data 1604. For example, in an embodiment, the network signature matching 1208 analyzes a TTL parameter of a TCP packet transmitted and/or received by an asset. In one or more embodiments, the network signature matching 1208 performs one or more fingerprinting techniques (e.g., one or more operation system fingerprinting techniques) that determines a data fingerprint for an asset (e.g., a data fingerprint associated with at least a portion of the asset property data 1604) and compares the data fingerprint against a repository of predetermined fingerprints.

Figure 17:
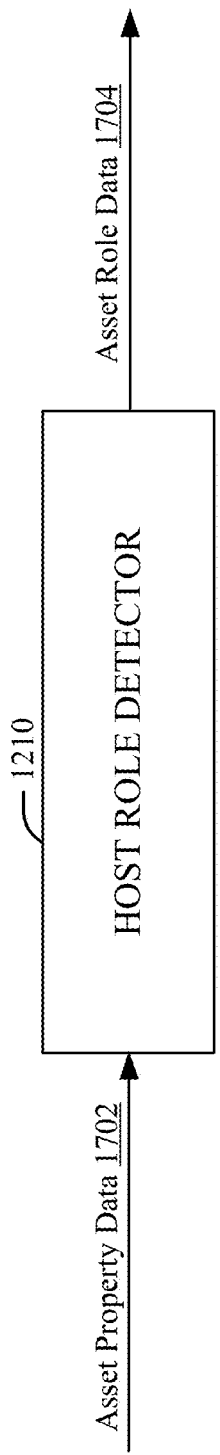
FIG. 17 illustrates exemplary host role detection, in accordance with one or more embodiments described herein.

FIG. 17 illustrates the host role detector 1210 according to one or more embodiments of the disclosure. In one or more embodiments, the asset discovery engine 602, the asset discovery component 304, and/or the asset vulnerability component 306 includes the host role detector 1210. In one or more embodiments, the host role detector 1210 analyzes gathered data related to one or more assets via a series of heuristic tests to determine a role or roles associated with respective assets. In one or more embodiments, the host role detector 1210 compares signatures of predetermined roles with the respective signatures for respective assets to determine one or more roles and/or one or more services provided by the respective assets. For example, in one or more embodiments, the host role detector 1210 employs asset property data 1702 associated with one or more assets to determine asset role data 1704 associated with one or more roles and/or one or more services provided by the one or more assets. The asset property data 1702 includes information such as, for example, an IP address, a MAC address, a hostname, a manufacturer, an operating system, a TCP port, a UDP port, a service, a role, metadata, flow flags, port status (e.g., open state, closed state, etc.), asset type, asset state, asset discovery information, and/or other information associated with the one or more asset. In one or more embodiments, the host role detector 1210 determines a main role and/or a main service provided by an asset by applying a weight to respective roles and/or respective services of the asset and selecting a highest weight.

Figure 18:
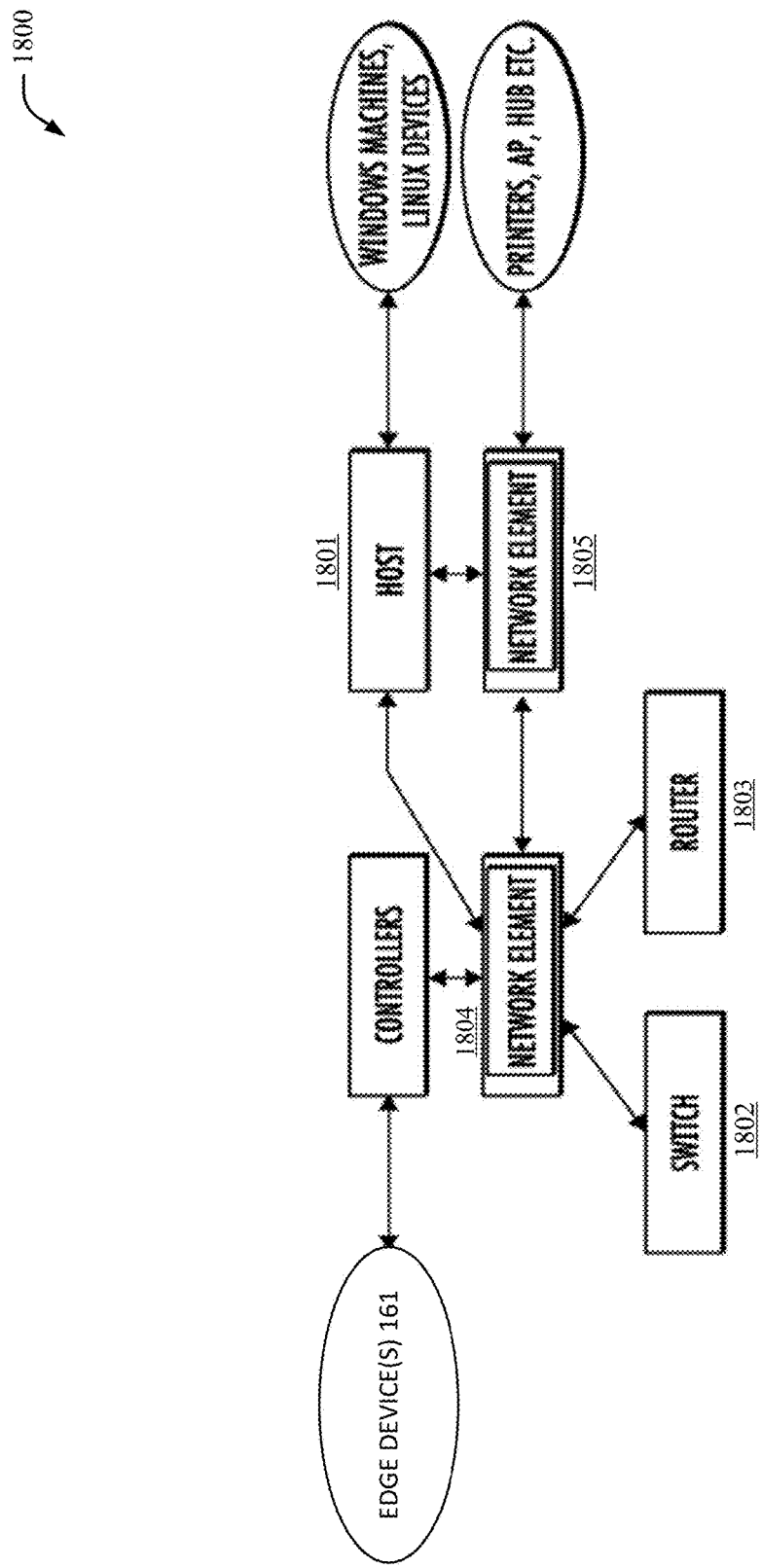
FIG. 18 illustrates an exemplary network functionality designation data object, in accordance with one or more embodiments described herein.

An operational example of a network functionality designation data object 1800 is depicted in FIG. 18. As depicted in FIG. 18, the network functionality designation data object 1800 provides (in addition to links between the depicted network assets) a network functionality designation for each network asset. For example, as depicted in the network functionality designation data object 1800 of FIG. 8, the network asset 1801 is a host, the network asset 1802 is a switch, the network asset 1803 is a router, and network assets 1804 and 1805 are undetected-type networking devices. In one or more embodiments, the network asset is a controller, a switch, a router, a network element, a host, a computing machine, a computing device, a printer, an AB, a hub, and/or an edge device (e.g., edge device(s) 161a-161n).

Figure 19:
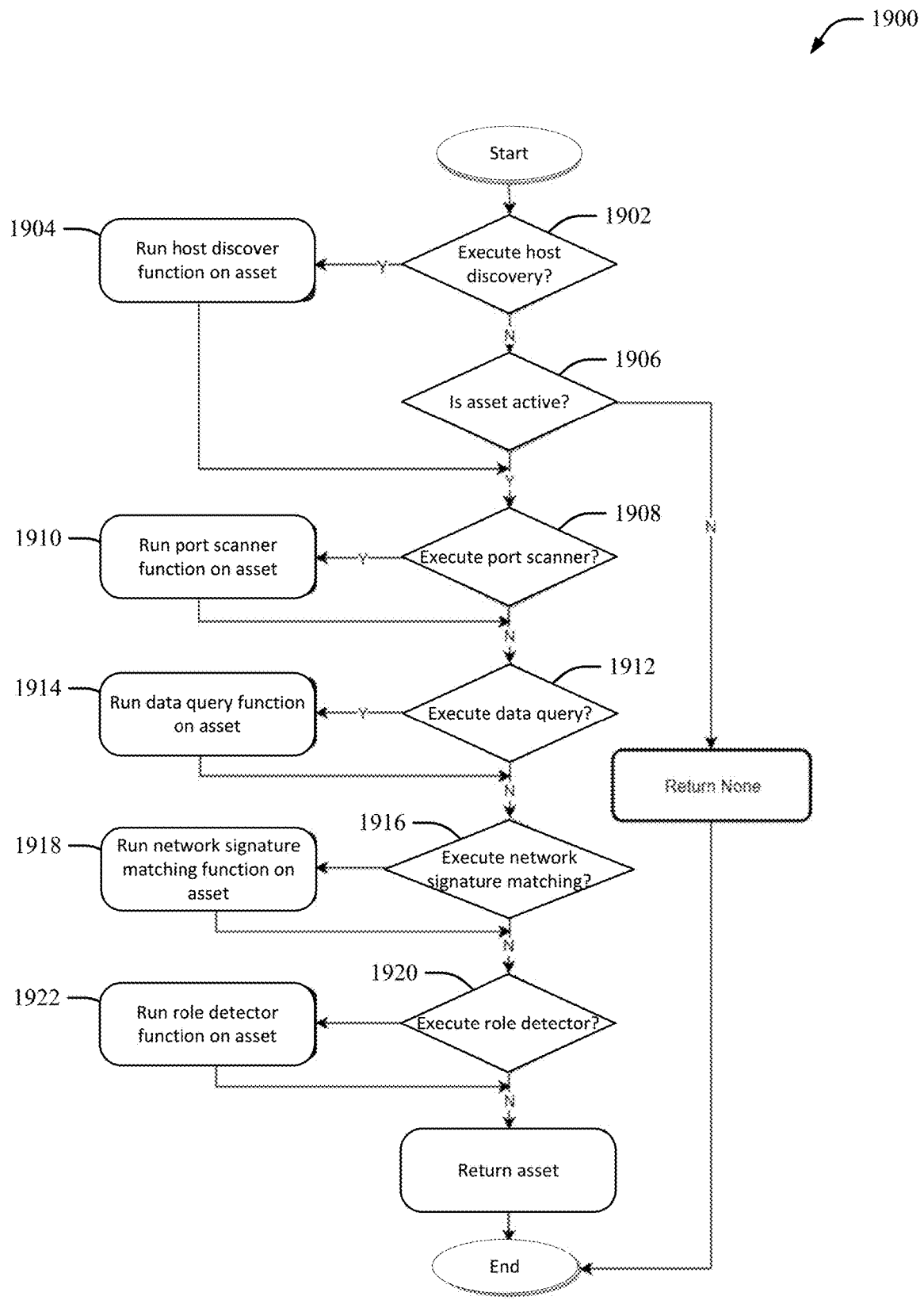
FIG. 19 illustrates an exemplary flow diagram related to a discovery process, in accordance with one or more embodiments described herein.

FIG. 19 illustrates an exemplary flow diagram 1900 related to the discovery process 1200 according to one or more embodiments of the disclosure. In an embodiment host discovery is executed at step 1902. In response to executing the host discovery, a host discovery function is run on an asset at step 1904. In some embodiments, a step 1906 is performed to determine whether an asset is active. In response to performing step 1904 and/or step 1906, the port scanner is executed at step 1908. In response to executing the port scanner, a port scanner function is run on an asset at step 1910. Additionally or alternatively, in response to performing step 1904 and/or step 1906, the data query is executed at step 1912. In response to executing the data query, a data query function is run on an asset at step 1914. Additionally or alternatively, in response to performing step 1904 and/or step 1906, the network signature matching is executed at step 1916. In response to executing the data signature matching, a network signature matching function is run on an asset at step 1918. Additionally or alternatively, in response to performing step 1904 and/or step 1906, the role detector is executed at step 1920. In response to executing the role detector, a role detector function is run on an asset at step 1922. In response to step 1908, step 1910, step 1912, step 1914, step 1916, step 1918, and/or step 1920, asset property data is provided and/or added to a smart discovery analyzer. In one or more embodiments, timestamp data is stored and/or correlated with respective asset property data.

Figure 20:
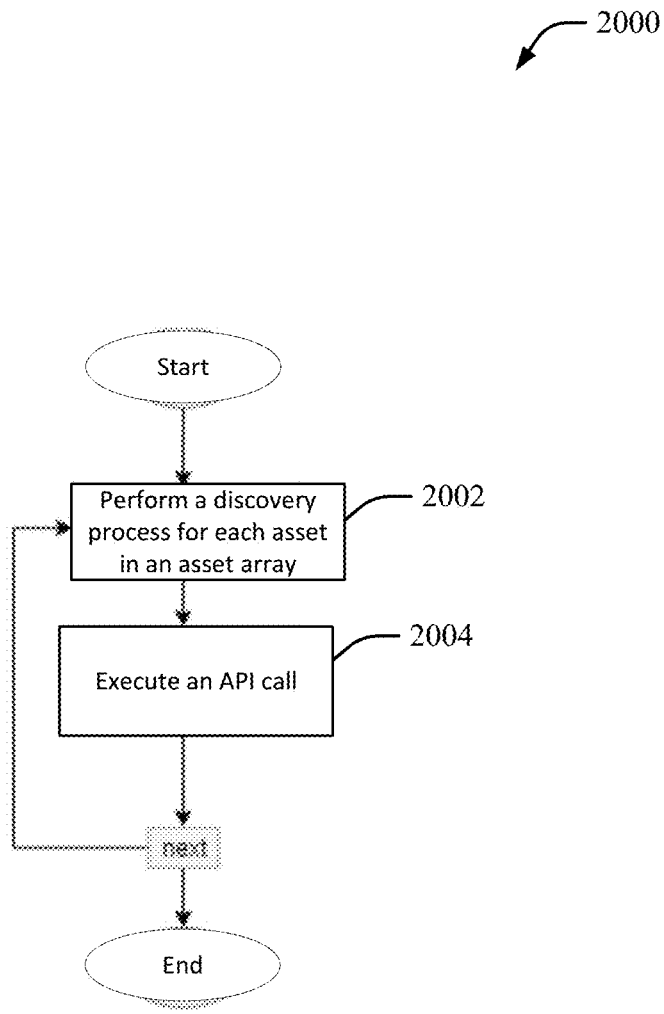
FIG. 20 illustrates another exemplary flow diagram related to a discovery process, in accordance with one or more embodiments described herein.
Figure 21:
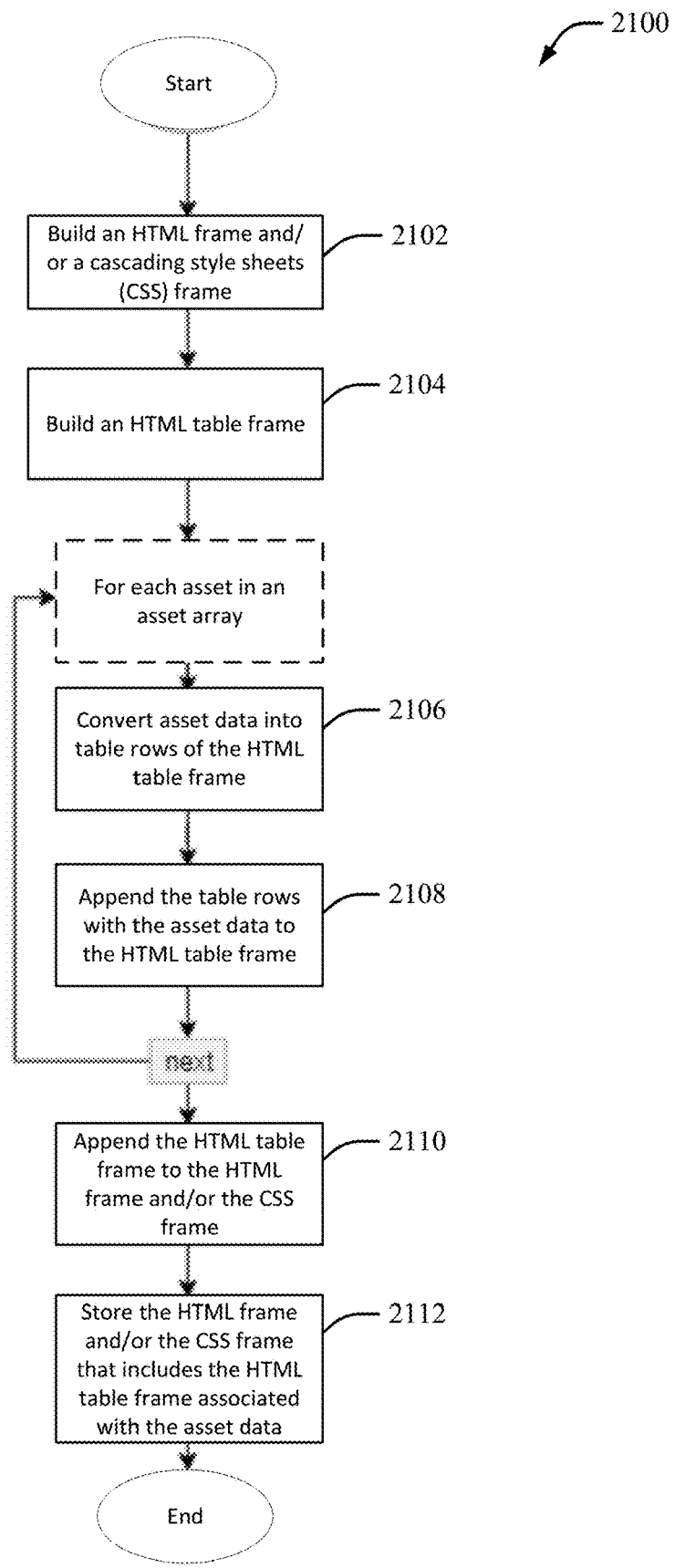
FIG. 21 illustrates an exemplary flow diagram related to generating an HTML, report, in accordance with one or more embodiments described herein.

FIG. 20 illustrates an exemplary flow diagram 2000 related to the discovery process 1200 according to one or more embodiments of the disclosure. In an embodiment a discovery process is performed for each asset in an asset array at step 2002. Furthermore, for each asset in an asset array, an API call is executed at 2004. In one or more embodiments, an HTML report is generated for each asset in response to the API call. In one or more embodiments, the HTML report includes asset information for the respective asset. FIG. 21 illustrates an exemplary flow diagram 2100 related to generating an HTML report. The flow diagram 2100 includes a step 2102 for building an HTML frame and/or a cascading style sheets (CSS) frame. The flow diagram 2100 also includes a step 2104 for building an HTML table frame. For each asset in an asset array, the flow diagram 2100 includes a step 2106 for converting asset data into table rows of the HTML table frame and/or a step 2108 for appending the tables rows with the asset data to the HTML table frame. The flow diagram 2100 also includes a step 2110 for appending the HTML table frame to the HTML frame and/or the CSS frame. Furthermore, in one or more embodiments, the flow diagram 2100 includes a step 2112 for storing the HTML, frame and/or the CSS frame that includes the HTML, table frame associated with the asset data.

Figure 22:
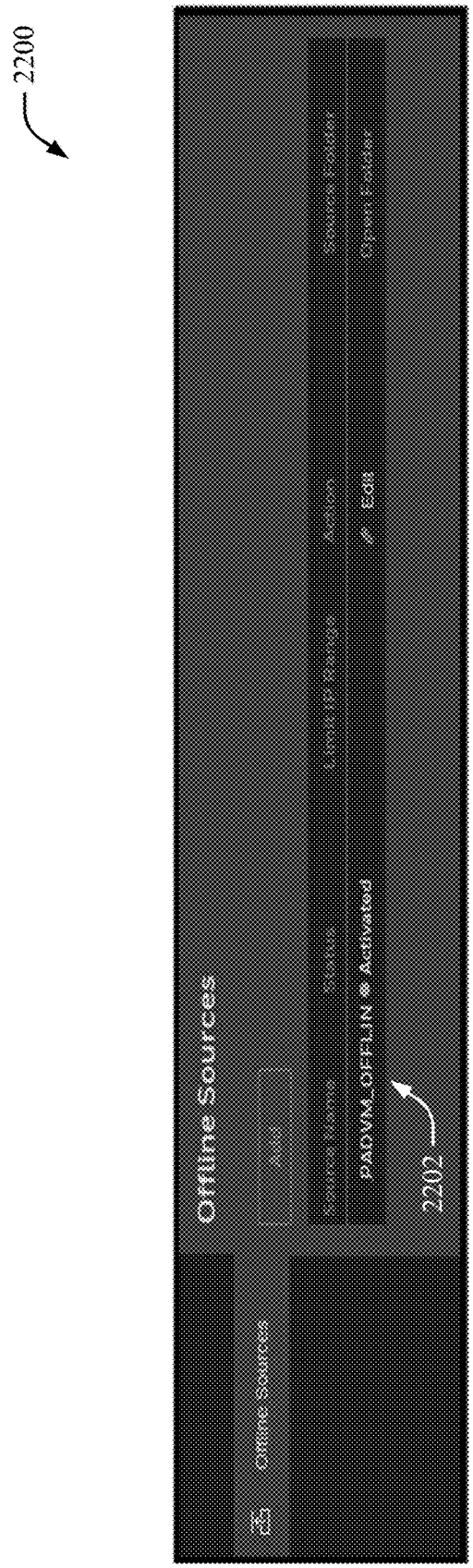
FIG. 22 illustrates an exemplary electronic interface, in accordance with one or more embodiments described herein.

FIG. 22 illustrates an exemplary electronic interface 2200 according to one or more embodiments of the disclosure. In one or more embodiments, the electronic interface 2200 illustrates an offline discovery mode for determining asset property data for one or more assets via one or more network capture files stored in a database (e.g., the asset property database 318) and/or a memory (e.g., the memory 312). For example, in certain embodiments, a visualization of an offline source 2202 is provided via the electronic interface 2200 to facilitate determining and/or obtaining asset property data via the offline source 2202. In one or more embodiments, a network capture file for the offline source 2202 can be saved by a network capture tool. In one or more embodiments, the offline source 2202 provides for saving captured asset property data to the offline source 2202 and/or reading one or more data files containing asset property data.

Figure 23:
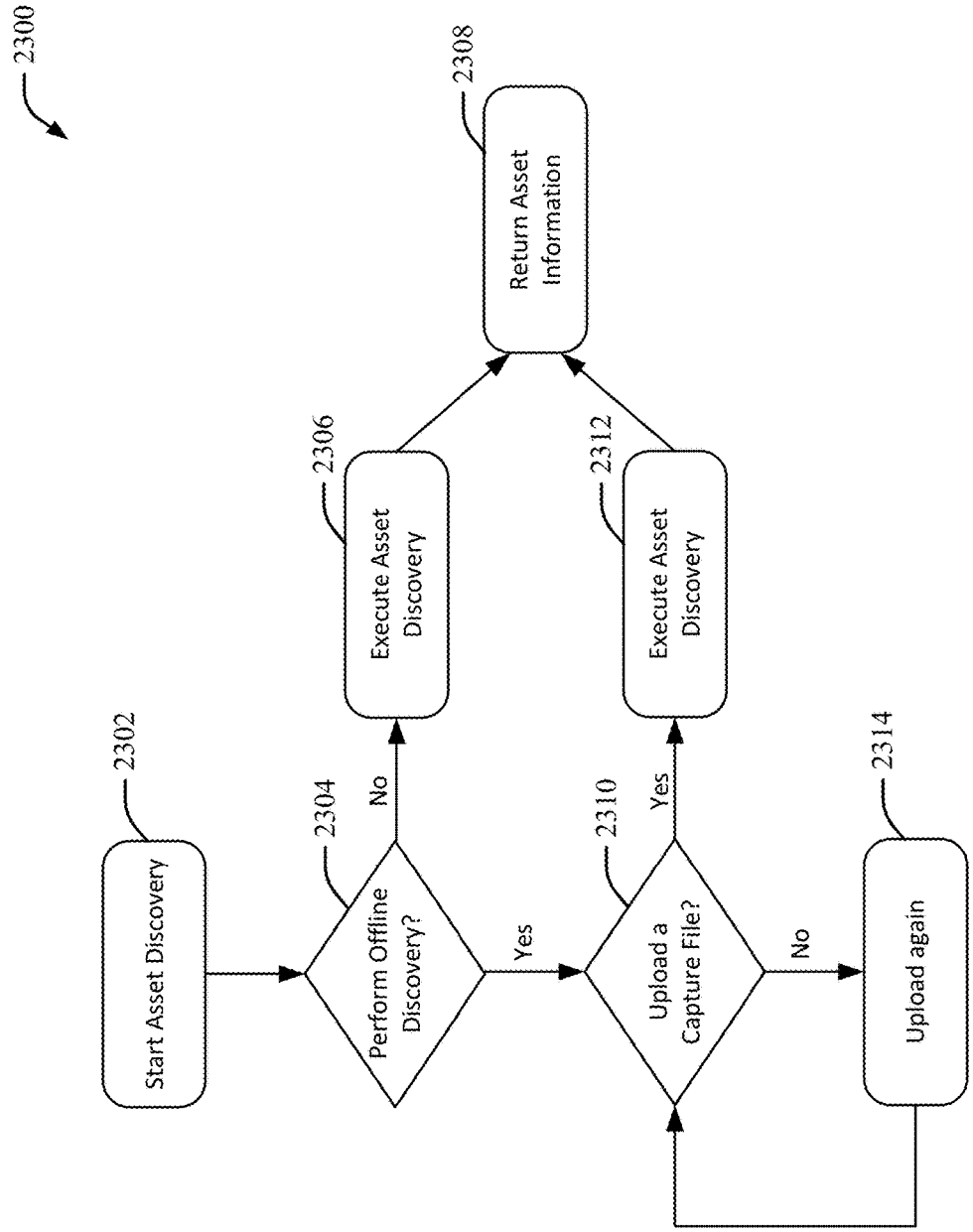
FIG. 23 illustrates an exemplary flow diagram, in accordance with one or more embodiments described herein.

FIG. 23 illustrates an exemplary flow diagram 2300 according to one or more embodiments of the disclosure. At step 2302, an asset discovery process is started. At step 2304, it is determined whether to perform offline discovery. Offline discovery includes, for example, analysis of one or more network capture files rather than real-time analysis of one or more assets. In one or more embodiments, the one or more network capture files provide an identity, properties, and/or parameters for one or more assets within an industrial plant. In one or more embodiments, the one or more network capture files store asset property data for the one or more assets. If no, asset discovery is executed (e.g., with respect to one or more assets within the network 110) at step 2306 to return asset information 2308 (e.g., asset property data). For example, in one or more embodiments, execution of the asset discovery includes initiating a smart asset discovery engine (e.g., the asset discovery component 304) to discover, collect and/or analyze data associated with one or more assets within the network 110. However, if no and at step 2310, it is determined whether to upload a capture file (e.g., a network capture file). If yes, asset discovery is executed (e.g., with respect to one or more network capture files) at step 2312 to return asset information 2308 (e.g., asset property data). If no, a capture file is uploaded again at step 2314.

Figure 24:
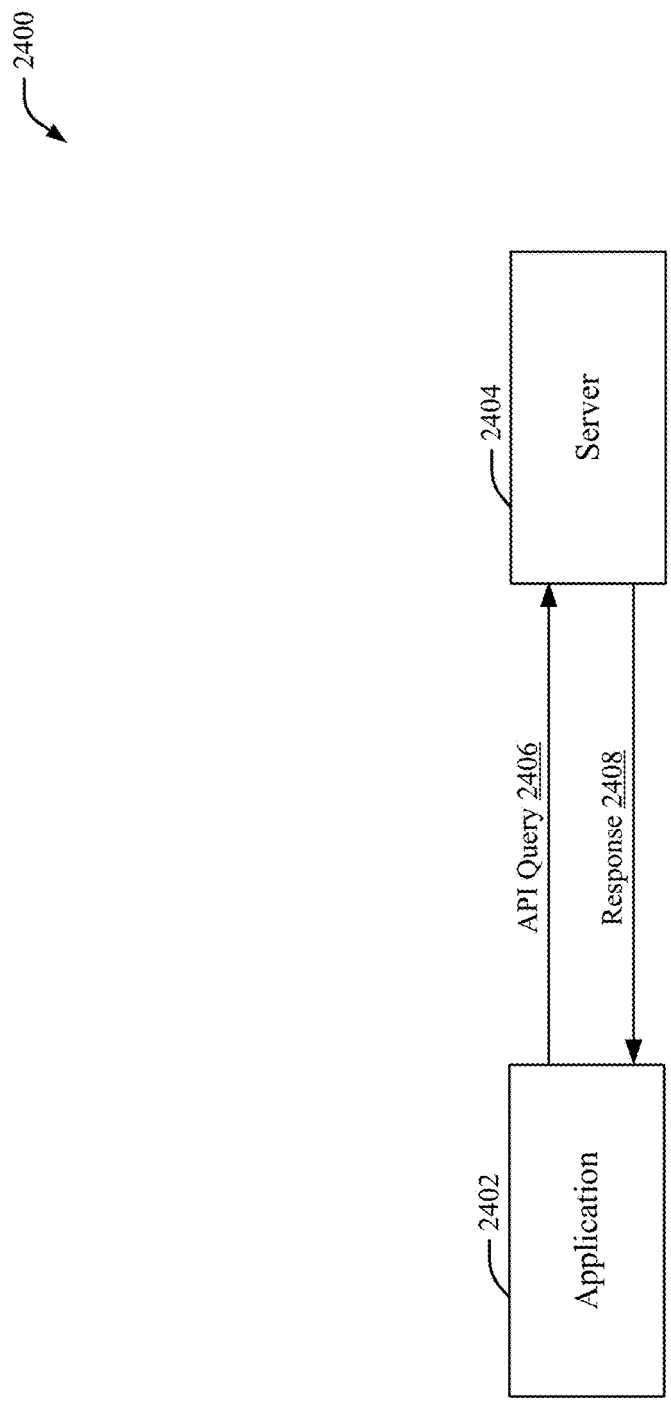
FIG. 24 illustrates another exemplary flow diagram, in accordance with one or more embodiments described herein.

FIG. 24 illustrates an exemplary system 2400 for discovery of a virtual machine according to one or more embodiments of the disclosure. The system 2400 includes an application 2402 and a server 2404. In an embodiment, the application 2402 corresponds to the asset vulnerability assessment computer system 302 and the server 2404 corresponds to an asset. In an embodiment, the application 2402 transmits an API query 2406 to the server 2404. In response to the API query 2406, the server 2404 can transmit a response 2408 to the application 2402. In one or more embodiments, at least a portion of asset property data for the server 2404 is determined based on the response 2408.

Figure 25:
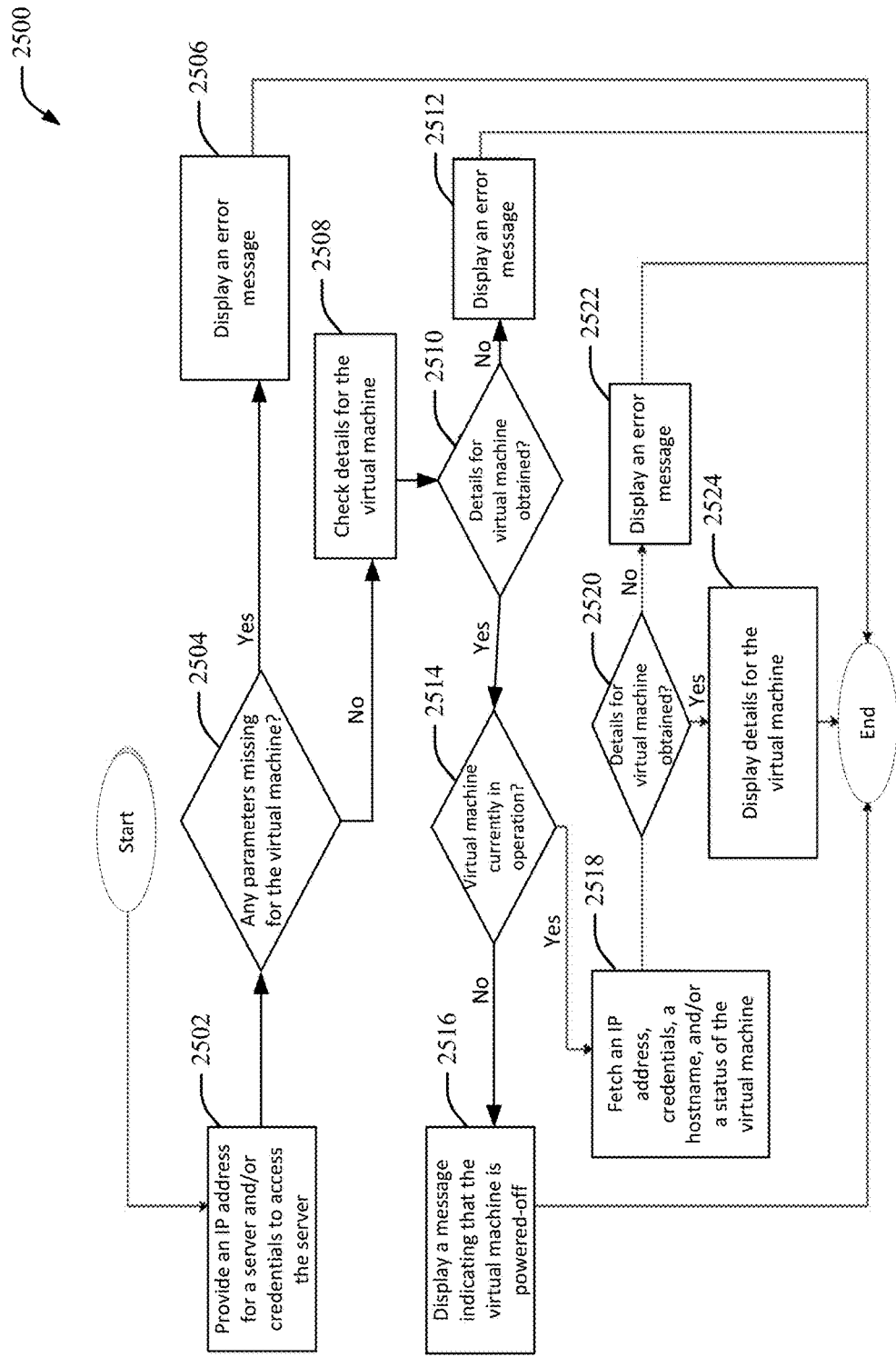
FIG. 25 illustrates another exemplary flow diagram, in accordance with one or more embodiments described herein.

FIG. 25 illustrates an exemplary flow diagram 2500 according to one or more embodiments of the disclosure. In one or more embodiments, the flow diagram 2500 is related to discovery of a virtual machine associated with the system 2400. For example, in one or more embodiments, the flow diagram 2500 collets asset details for one or more virtual machines in a virtual machine infrastructure. The flow diagram 2500 includes a step 2502 for providing an IP address for a server and/or credentials to access the server. At step 2504, it is determined whether any parameters are missing for the virtual machine. If yes, an error message is displayed (e.g., via the computing device 402) at step 2506. If no, details for the virtual machine are checked at step 2508. At step 2510, it is determined whether the details for the virtual machine are successfully obtained. If no, an error message is displayed (e.g., via the computing device 402) at step 2512. If yes, it is determined at step 2514 whether the virtual machine is currently in operation (e.g., powered on). If no, a message indicating that the virtual machine is powered-off is displayed (e.g., via the computing device 402) at step 2516. If yes, an IP address, credentials, a hostname, and/or a status of the virtual machine if fetched at step 2518. At step 2520, it is determined whether the details for the virtual machine are successfully obtained. If no, an error message is displayed (e.g., via the computing device 402) at step 2522. If yes, the details for the virtual machine are displayed at step 2524. The details for the virtual machine include, for example, a power state of the virtual machine, a hostname for the virtual machine, an IP address for the virtual machine, a status of the virtual machine, version information for the virtual machine, and/or other details regarding properties of the virtual machine.

Figure 26:
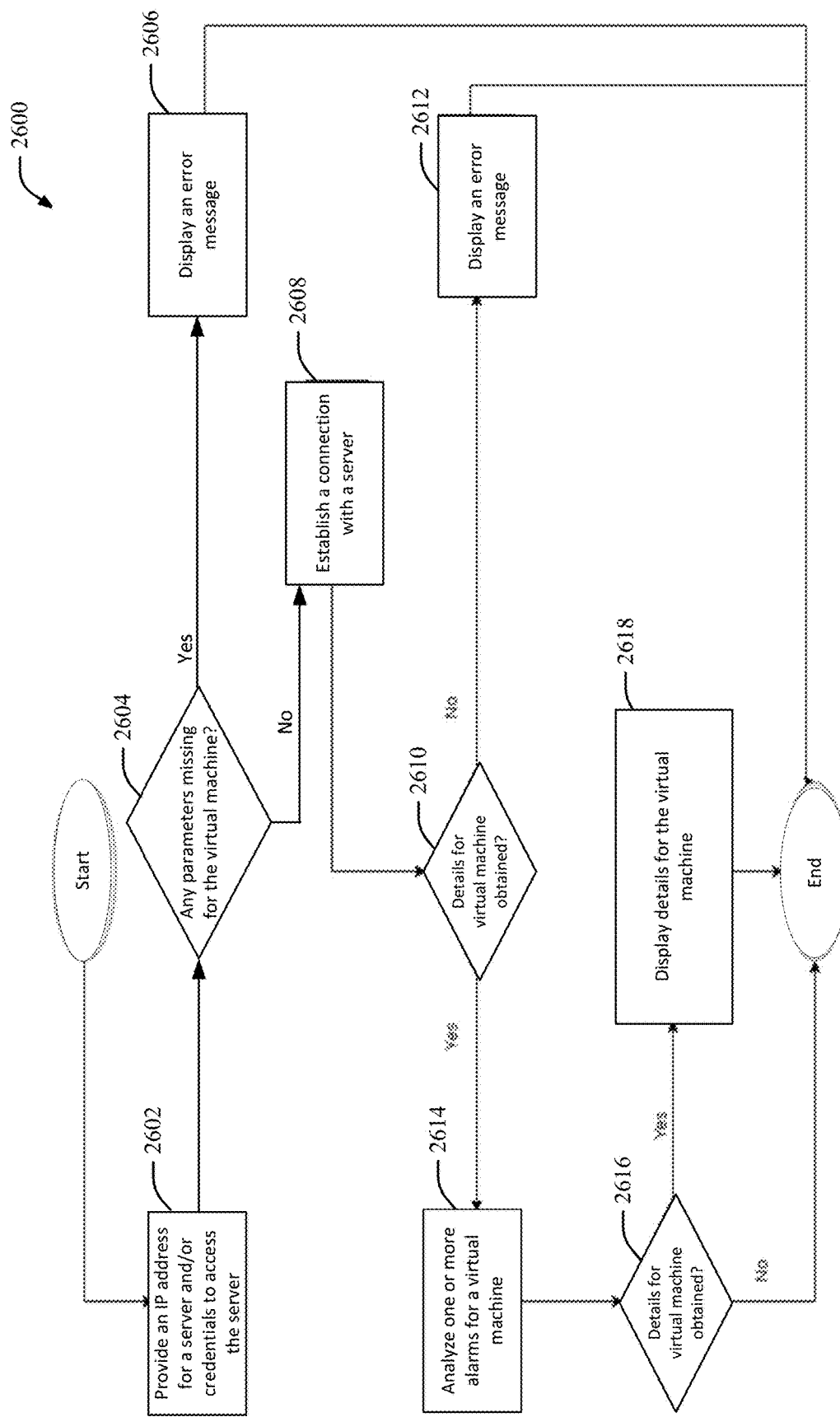
FIG. 26 illustrates another exemplary flow diagram, in accordance with one or more embodiments described herein.

FIG. 26 illustrates an exemplary flow diagram 2600 according to one or more embodiments of the disclosure. In one or more embodiments, the flow diagram 2600 is related to discovery of a virtual machine associated with the system 2400. For example, in one or more embodiments, the flow diagram 2600 discovers one or more alarms related to one or more virtual machines in a virtual machine infrastructure. The flow diagram 2600 includes a step 2602 for providing an IP address for a server and/or credentials to access the server. At step 2604, it is determined whether any parameters are missing for the virtual machine. If yes, an error message is displayed (e.g., via the computing device 402) at step 2606. If no, a connection is established with a server at step 2608. At step 2610, it is determined whether the details for the virtual machine are successfully obtained. If no, an error message is displayed (e.g., via the computing device 402) at step 2612. If yes, one or more alarms for a virtual machine are analyzed at step 2614. At step 2616, it is determined whether the details for the virtual machine are successfully obtained. If no, the flow diagram 2600 ends. If yes, the details for the alarms are displayed at step 2618. The details for the alarm include, for example, a one or more alarm occurrence timestamps, an IP address for a virtual machine associated with an alarm, formatted text associated with an alarm, and/or one or more other details related to an alarm.

Figure 27:
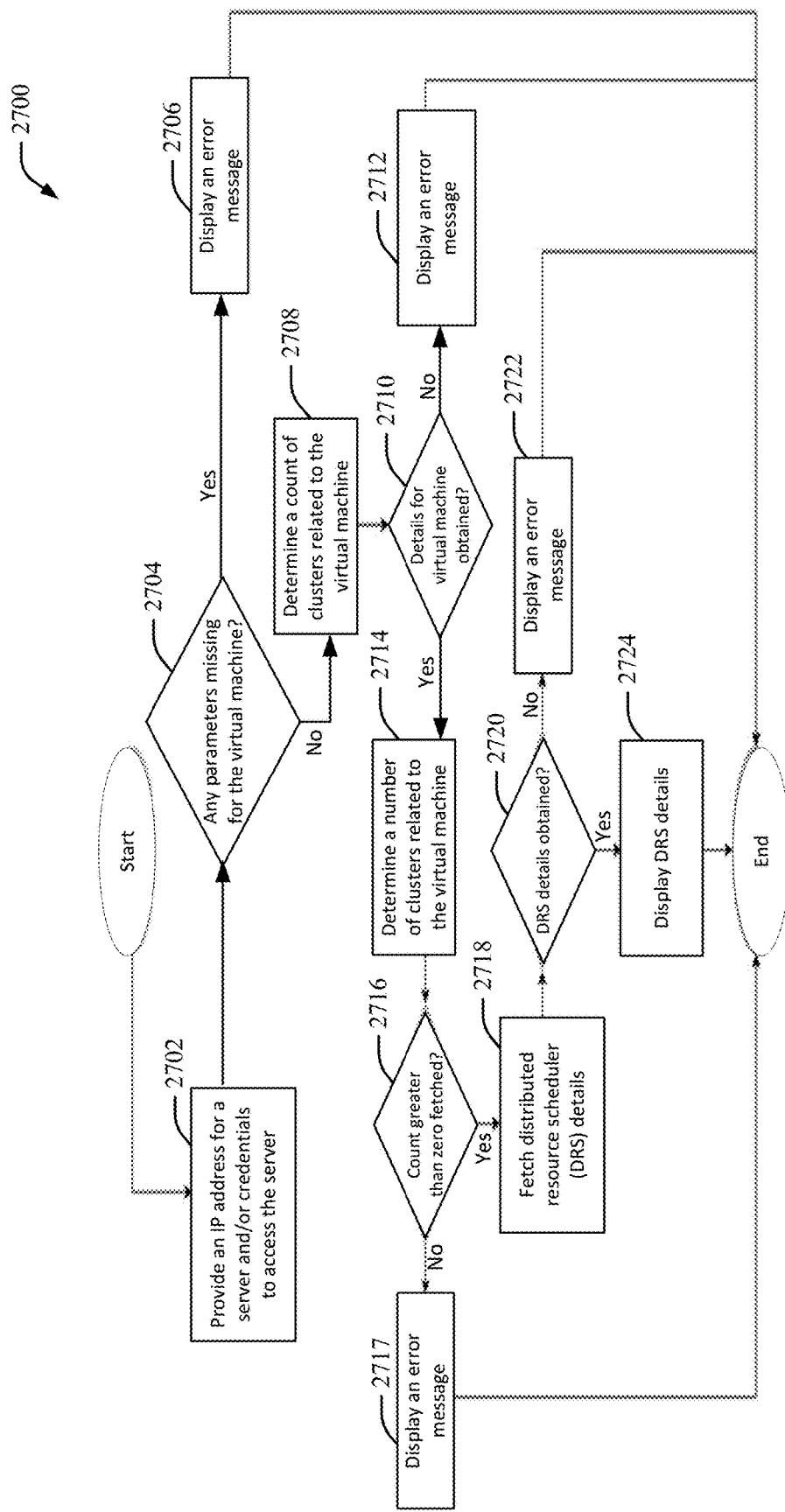
FIG. 27 illustrates another exemplary flow diagram, in accordance with one or more embodiments described herein.

FIG. 27 illustrates an exemplary flow diagram 2700 according to one or more embodiments of the disclosure. In one or more embodiments, the flow diagram 2700 is related to collection of hardware information for an asset via discovery of a virtual machine associated with the system 2400. The flow diagram 2700 includes a step 2702 for providing an IP address for a server and/or credentials to access the server. At step 2704, it is determined whether any parameters are missing for the virtual machine. If yes, an error message is displayed (e.g., via the computing device 402) at step 2706. If no, a count of clusters related to the virtual machine are determined at step 2708. At step 2710, it is determined whether the details for the virtual machine are successfully obtained. If no, an error message is displayed (e.g., via the computing device 402) at step 2712. If yes, a number of clusters related to the virtual machine are determined at step 2714. At step 2716, it is determined whether a count greater than zero is successfully fetched. If no, error details are displayed (e.g., via the computing device 402) at step 2717. If yes, distributed resource scheduler (DRS) details are fetched at step 2718. The DRS details include, for example, whether load balancing and/or another workload management process is enabled, an automation level related to load balancing and/or another workload management process, a mode for load balancing and/or another workload management process, and/or other DRS details. At step 2720, it is determined whether the DRS details are successfully obtained. If no, error details are displayed (e.g., via the computing device 402) at step 2722. If yes, the DRS details are displayed at step 2724.

Figure 28:
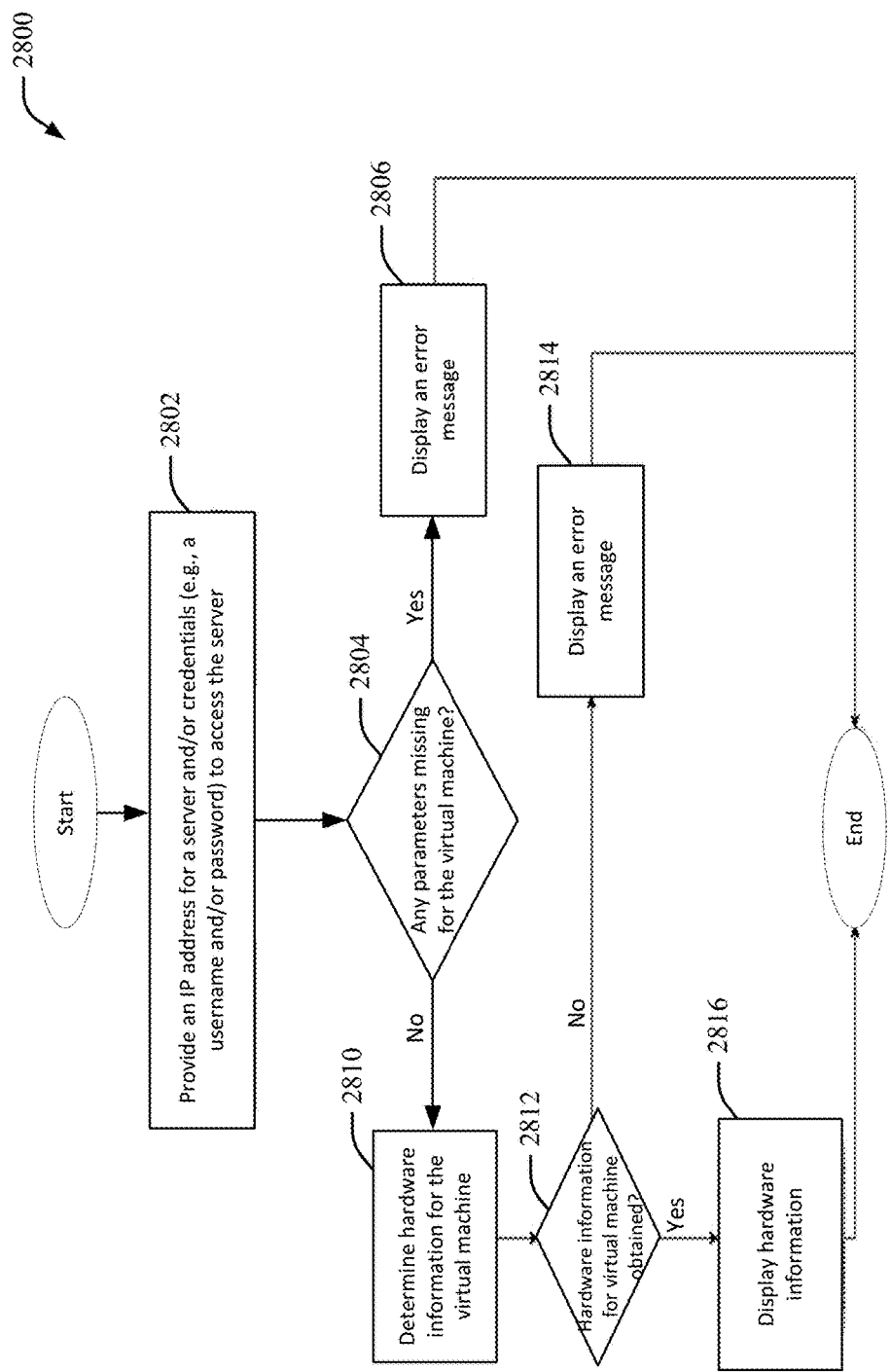
FIG. 28 illustrates another exemplary flow diagram, in accordance with one or more embodiments described herein.

FIG. 28 illustrates an exemplary flow diagram 2800 according to one or more embodiments of the disclosure. In one or more embodiments, the flow diagram 2800 is related to collection of hardware information for an asset via discovery of a virtual machine associated with the system 2400. The flow diagram 2800 includes a step 2802 for providing an IP address for a server and/or credentials (e.g., a username and/or password) to access the server. At step 2804, it is determined whether any parameters are missing for the virtual machine. If yes, an error message is displayed (e.g., via the computing device 402) at step 2806. If no, hardware information for the virtual machine is determined at step 2810. The hardware information includes, for example, CPU core information, CPU socket information, CPU current clock, CPU maximum clock, CPU name, CPU load percentage, CPU type, CPU utilization, name of data store, size of datastore, free space in datastore, used space in datastore, free space as a percentage of total size of datastore, used space as a percentage of total size of datastore, datastore file system, datastore availability, errors associated with a database, total physical memory, free physical memory, free physical memory percentage, cluster memory utilization, and/or other hardware information. At step 2812, it is determined whether the hardware information for the virtual machine is successfully obtained. If no, an error message is displayed (e.g., via the computing device 402) at step 2814. If yes, the hardware information is displayed (e.g., via the computing device 402) at step 2816.

Figure 29:
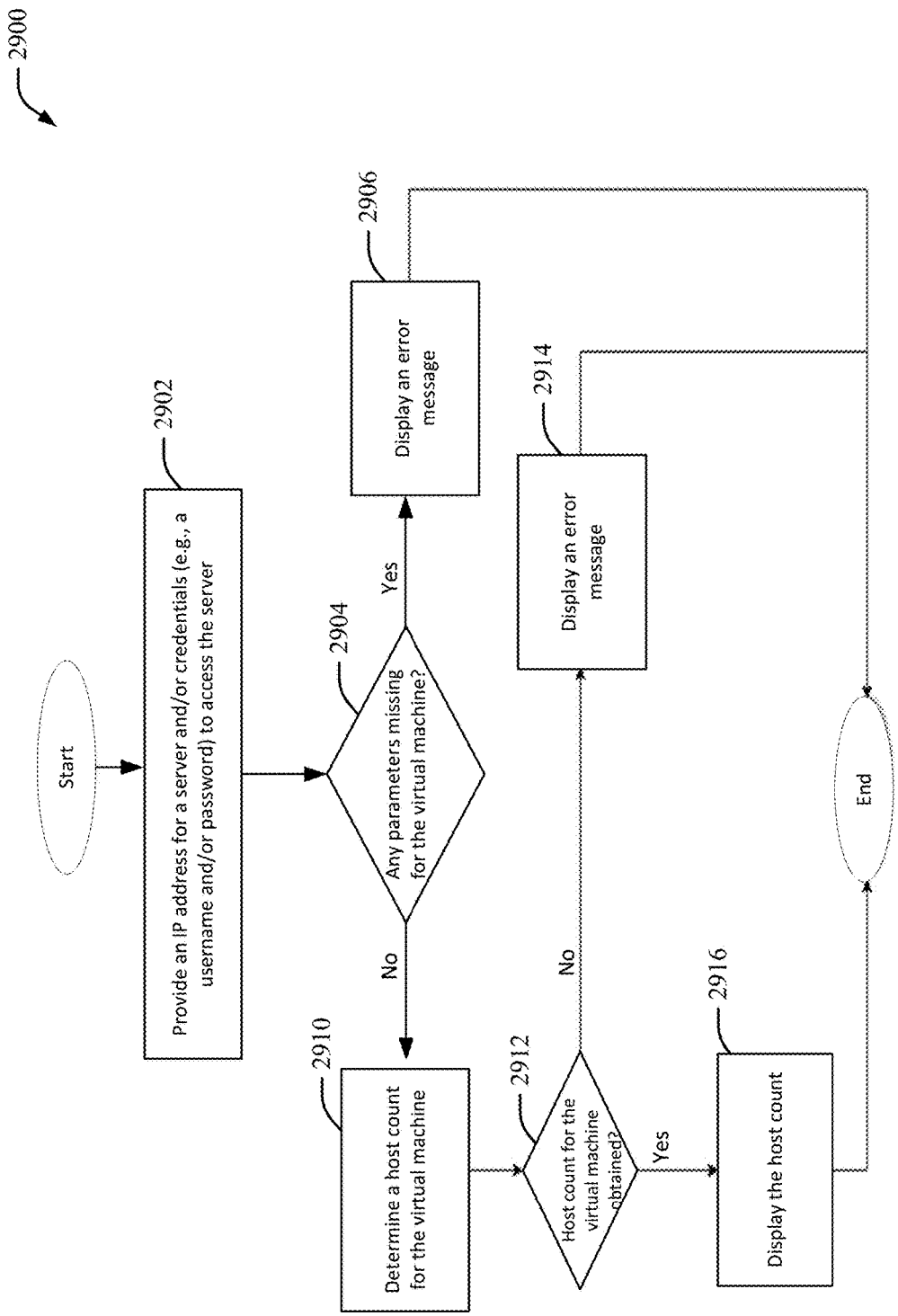
FIG. 29 illustrates another exemplary flow diagram, in accordance with one or more embodiments described herein.

FIG. 29 illustrates an exemplary flow diagram 2900 according to one or more embodiments of the disclosure. In one or more embodiments, the flow diagram 2900 is related to collection of hardware information for an asset via discovery of a virtual machine associated with the system 2400. The flow diagram 2900 includes a step 2902 for providing an IP address for a server and/or credentials (e.g., a username and/or password) to access the server. At step 2904, it is determined whether any parameters are missing for the virtual machine. If yes, an error message is displayed (e.g., via the computing device 402) at step 2906. If no, a host count for the virtual machine is determined at step 2910. The host count is, for example, a number of hosts managed by the virtual machine. At step 2912, it is determined whether the host count for the virtual machine is successfully obtained. If no, an error message is displayed (e.g., via the computing device 402) at step 2914. If yes, the host count is displayed (e.g., via the computing device 402) at step 2916.

Figure 30:
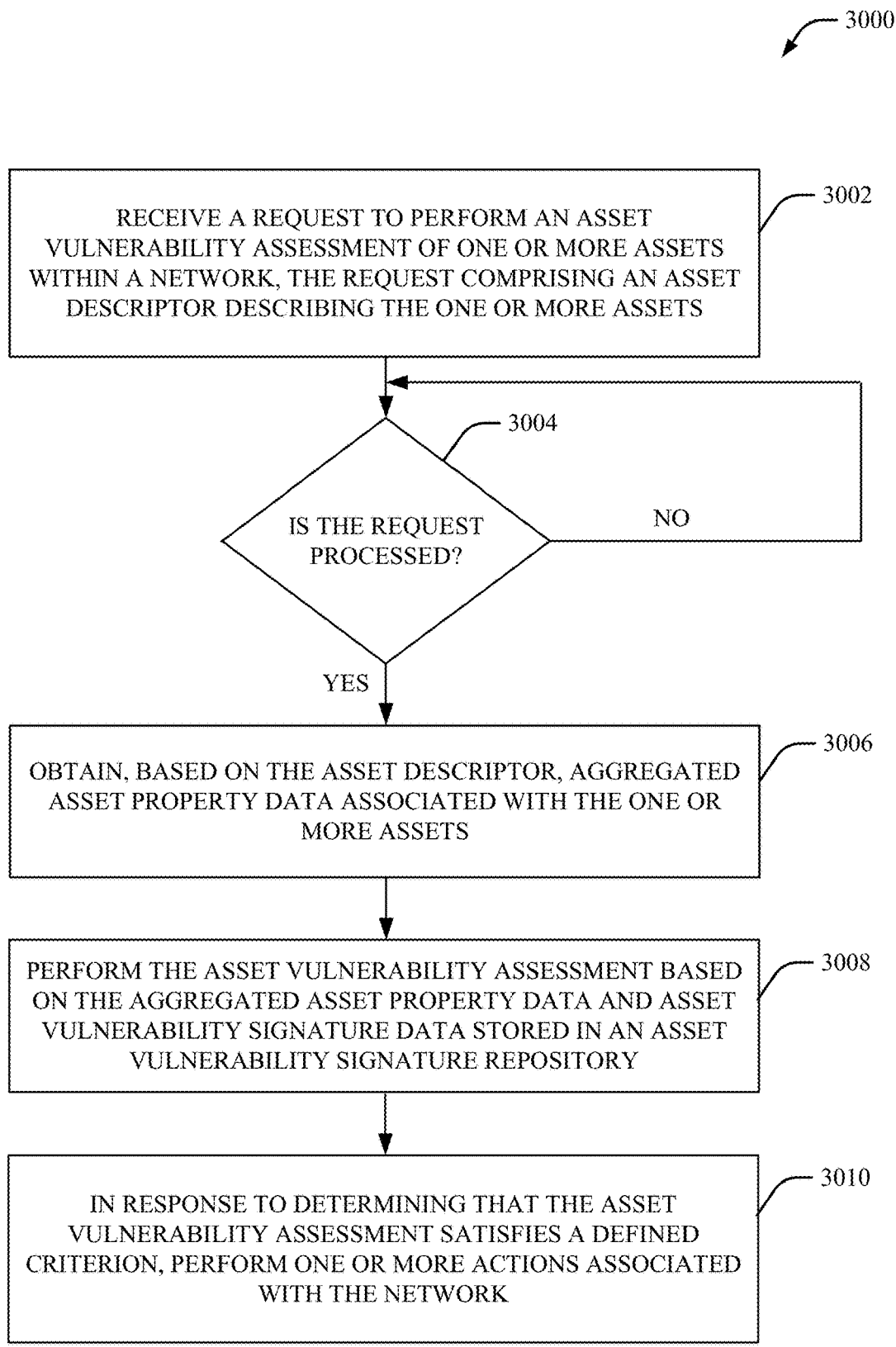
FIG. 30 illustrates a flow diagram for generating aggregated asset properties for assets discovered in a network to perform cybersecurity vulnerability assessment of the assets using the aggregated asset properties, in accordance with one or more embodiments described herein.

FIG. 30 illustrates a method 3000 for generating aggregated asset properties for assets discovered in a network to perform cybersecurity vulnerability assessment of the assets using the aggregated asset properties, in accordance with one or more embodiments described herein. The method 3000 is associated with the asset vulnerability assessment computer system 302, for example. For instance, in one or more embodiments, the method 3000 is executed at a device (e.g., the asset vulnerability assessment computer system 302) with one or more processors and a memory. In one or more embodiments, the method 3000 begins at block 3002 that receives (e.g., by the asset vulnerability component 306) a request to perform an asset vulnerability assessment of one or more assets within a network, the request comprising an asset descriptor describing the one or more assets. The request provides one or more technical improvements such as, but not limited to, facilitating interaction with a computing device and/or extended functionality for a computing device. In one or more embodiments, the receiving the request includes receiving the request to perform the asset vulnerability assessment in response to an asset discovery process associated with the network.

At block 3004, it is determined whether the request is processed. If no, block 3004 is repeated to determine whether the request is processed. If yes, the method 3000 proceeds to block 3006. In response to the request, block 3006 obtains, based on the asset descriptor (e.g., by the asset vulnerability component 306), aggregated asset property data associated with the one or more assets. The obtaining provides one or more technical improvements such as, but not limited to, extended functionality for a computing device. In one or more embodiments, the obtaining the aggregated asset property data includes obtaining the aggregated asset property data from a formatted data structure that stores the aggregated asset property data.

In response to the request, the method 3000 also includes a block 3008 that performs (e.g., by the asset vulnerability component 306) the asset vulnerability assessment based on the aggregated asset property data and asset vulnerability signature data stored in an asset vulnerability signature repository. The performing the asset vulnerability assessment provides one or more technical improvements such as, but not limited to, improving accuracy of the dashboard visualization.

In response to the request, the method 3000 also includes a block 3010 that performs (e.g., by the action component 308) one or more actions associated with the network in response to determining that the asset vulnerability assessment satisfies a defined criterion. The performing the one or more actions provides one or more technical improvements such as, but not limited to, what and/or how to present information via a computing device.

In one or more embodiments, the method 3000 additionally or alternatively includes generating the aggregated asset property data by monitoring network traffic broadcasted to the one or more assets. In one or more embodiments, the method 3000 additionally or alternatively includes generating the aggregated asset property data based on one or more communications broadcasted by the one or more assets. In one or more embodiments, the method 3000 additionally or alternatively includes generating the aggregated asset property data by scanning, based on one or more data acquisition protocols associated with the one or more assets, one or more ports of the one or more assets.

In one or more embodiments, the method 3000 additionally or alternatively includes generating respective asset risk scores for the one or more assets based on the asset vulnerability assessment. Additionally or alternatively, the performing the one or more actions can include performing the one or more actions associated with the network based on the respective asset risk scores.

In one or more embodiments, the method 3000 additionally or alternatively includes generating respective asset risk scores for the one or more assets based on compliance analysis of hardware components associated with the one or more assets with respect to a virtualized infrastructure of the network. In one or more embodiments, the method 3000 additionally or alternatively includes generating respective asset risk scores for the one or more assets based on compliance analysis of software components associated with the one or more assets with respect to a virtualized infrastructure of the network.

In one or more embodiments, the method 3000 additionally or alternatively includes generating classification data associated with the one or more assets based on the aggregated asset property data. Additionally or alternatively, the performing the asset vulnerability assessment can include performing the asset vulnerability assessment based on the classification data.

In one or more embodiments, the method 3000 additionally or alternatively includes performing the asset discovery process in response to an action initiated via an electronic interface of a computing device associated with a user. In one or more embodiments, the method 3000 additionally or alternatively includes performing the asset discovery process in response to an action initiated in response to a timer satisfying a defined timer threshold value. In one or more embodiments, the method 3000 additionally or alternatively includes performing the asset discovery process based on one or more performance requirements associated with the one or more assets.

In one or more embodiments, the method 3000 additionally or alternatively includes determining role classification data indicating one or more roles for the one or more assets based on a set of heuristic tests associated with the aggregated asset property data.

In one or more embodiments, the method 3000 additionally or alternatively includes selecting the asset vulnerability signature data from the asset vulnerability signature repository based on a network zone identifier associated with the network.

In one or more embodiments, the method 3000 additionally or alternatively includes presenting, based on the asset vulnerability assessment, a visualization via an electronic interface of a computing device. In one or more embodiments, the method 3000 additionally or alternatively includes reconfiguring an asset from the one or more assets based on the asset vulnerability assessment.

Figure 31:
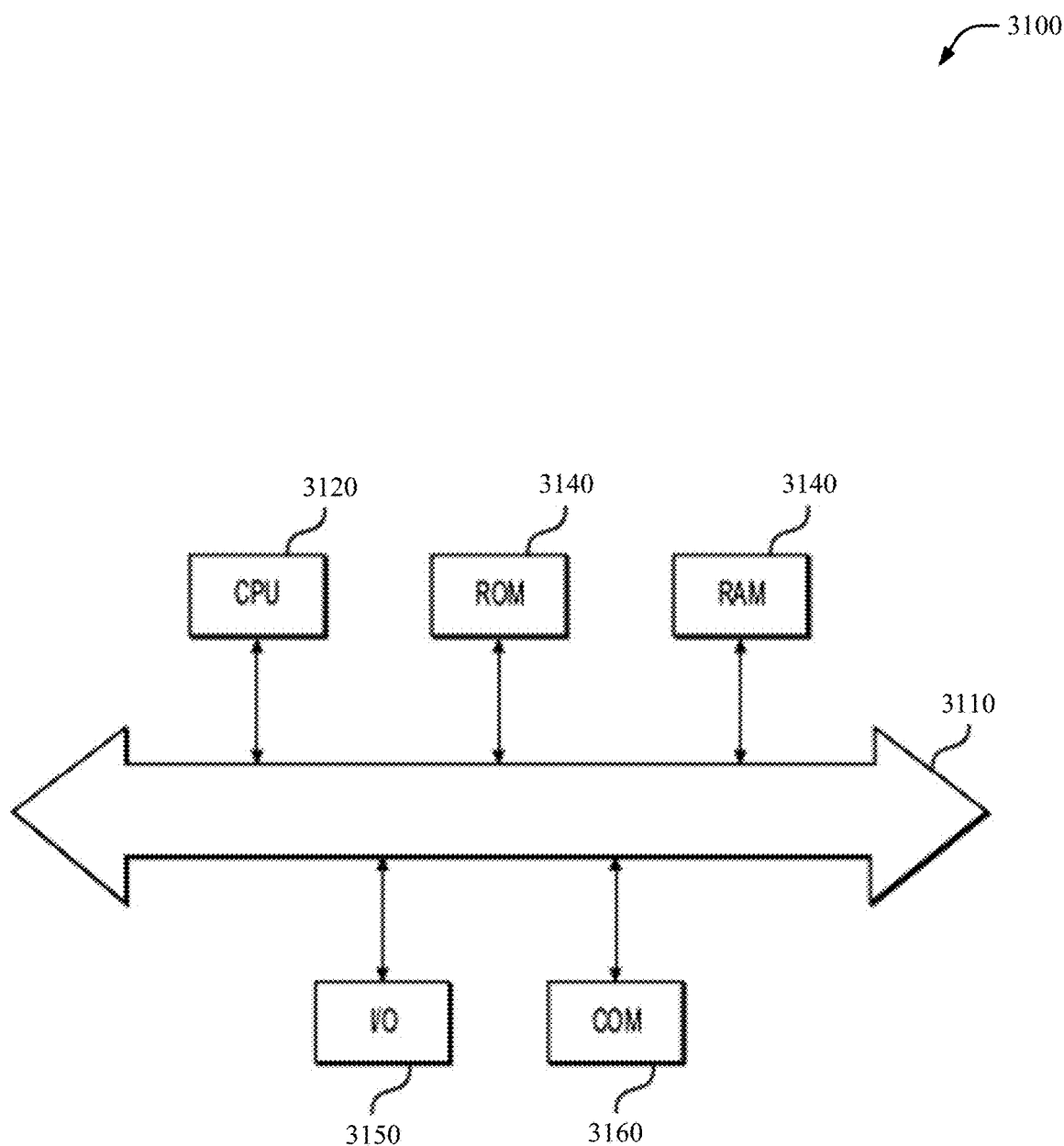
FIG. 31 illustrates a functional block diagram of a computer that may be configured to execute techniques described in accordance with one or more embodiments described herein.

FIG. 31 depicts an example system 3100 that may execute techniques presented herein. FIG. 31 is a simplified functional block diagram of a computer that may be configured to execute techniques described herein, according to exemplary embodiments of the present disclosure. Specifically, the computer (or "platform" as it may not be a single physical computer infrastructure) may include a data communication interface 3160 for packet data communication. The platform also may include a central processing unit ("CPU") 3120, in the form of one or more processors, for executing program instructions. The platform may include an internal communication bus 3110, and the platform also may include a program storage and/or a data storage for various data files to be processed and/or communicated by the platform such as ROM 3130 and RAM 3140, although the system 3100 may receive programming and data via network communications. The system 3100 also may include input and output ports 3150 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments can be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

It is intended that the specification and examples be considered as exemplary only, with a true scope and spirit of the disclosure being indicated by the following claims.

What is claimed is:

1. A system, comprising:
   one or more processors;
   a memory; and
   one or more programs stored in the memory, the one or more programs comprising instructions configured to:
      receive a request to perform an asset vulnerability assessment of one or more assets within a network, the request comprising:
         an asset descriptor describing the one or more assets; and
      in response to the request:
         obtain, based on the asset descriptor, aggregated asset property data associated with the one or more assets, wherein the aggregated asset property data is collected for the one or more assets in one or more levels of the network;
         perform the asset vulnerability assessment based on the aggregated asset property data and asset vulnerability signature data stored in an asset vulnerability signature repository;
         determine vulnerability for an asset in a level based on a comparison of one or more portions of the aggregated asset property data to one or more portions of the asset vulnerability signature data; and
         in response to determining that the asset vulnerability assessment satisfies a defined criterion, perform one or more actions associated with the network.

2. The system of claim 1, the one or more programs further comprising instructions configured to:
   generate the aggregated asset property data by monitoring network traffic broadcasted to the one or more assets.

3. The system of claim 1, the one or more programs further comprising instructions configured to:
   generate the aggregated asset property data based on one or more communications broadcasted by the one or more assets.

4. The system of claim 1, the one or more programs further comprising instructions configured to:
   generate the aggregated asset property data by scanning, based on one or more data acquisition protocols associated with the one or more assets, one or more ports of the one or more assets.

5. The system of claim 1, the one or more programs further comprising instructions configured to:
   generate respective asset risk scores for the one or more assets based on the asset vulnerability assessment; and
   perform the one or more actions associated with the network based on the respective asset risk scores, wherein the one or more actions comprise: providing one or more recommended actions, transmitting one or more notifications associated with the asset vulnerability assessment, generating a report associated with the asset vulnerability assessment, altering one or more portions of the network, providing an optimal process condition for the asset, and adjusting a set-point and/or a schedule for the asset.

6. The system of claim 5, the one or more programs further comprising instructions configured to:
generate the respective asset risk scores for the one or more assets based on compliance analysis of hardware components associated with the one or more assets with respect to a virtualized infrastructure of the network.

7. The system of claim 5, the one or more programs further comprising instructions configured to:
generate the respective asset risk scores for the one or more assets based on compliance analysis of software components associated with the one or more assets with respect to a virtualized infrastructure of the network.

8. The system of claim 1, the one or more programs further comprising instructions configured to:
generate classification data associated with the one or more assets based on the aggregated asset property data; and
perform the asset vulnerability assessment based on the classification data.

9. The system of claim 1, the one or more programs further comprising instructions configured to:
select the asset vulnerability signature data from the asset vulnerability signature repository based on a network zone identifier associated with the network.

10. A method, comprising:
at a device with one or more processors and a memory:
receiving a request to perform an asset vulnerability assessment of one or more assets within a network, the request comprising:
an asset descriptor describing the one or more assets; and
in response to the request:
obtaining, based on the asset descriptor, aggregated asset property data associated with the one or more assets, wherein the aggregated asset property data is collected for the one or more assets in one or more levels of the network;
performing the asset vulnerability assessment based on the aggregated asset property data and asset vulnerability signature data stored in an asset vulnerability signature repository;
determining vulnerability for an asset in a level based on a comparison of one or more portions of the aggregated asset property data to one or more portions of the asset vulnerability signature data; and
in response to determining that the asset vulnerability assessment satisfies a defined criterion, performing one or more actions associated with the network.

11. The method of claim 10, further comprising:
generating the aggregated asset property data by monitoring network traffic broadcasted to the one or more assets.

12. The method of claim 10, further comprising:
generating the aggregated asset property data based on one or more communications broadcasted by the one or more assets.

13. The method of claim 10, further comprising:
generating the aggregated asset property data by scanning, based on one or more data acquisition protocols associated with the one or more assets, one or more ports of the one or more assets.

14. The method of claim 10, further comprising:
generating respective asset risk scores for the one or more assets based on the asset vulnerability assessment, and the performing the one or more actions comprising performing the one or more actions associated with the network based on the respective asset risk scores, wherein the one or more actions comprise: providing one or more recommended actions, transmitting one or more notifications associated with the asset vulnerability assessment, generating a report associated with the asset vulnerability assessment, altering one or more portions of the network, providing an optimal process condition for the asset, and adjusting a set-point and/or a schedule for the asset.

15. The method of claim 14, further comprising:
generating the respective asset risk scores for the one or more assets based on compliance analysis of hardware components associated with the one or more assets with respect to a virtualized infrastructure of the network.

16. The method of claim 14, further comprising:
generating the respective asset risk scores for the one or more assets based on compliance analysis of software components associated with the one or more assets with respect to a virtualized infrastructure of the network.

17. The method of claim 10, further comprising:
generating classification data associated with the one or more assets based on the aggregated asset property data; and
the performing the asset vulnerability assessment comprising performing the asset vulnerability assessment based on the classification data.

18. The method of claim 10, further comprising:
selecting the asset vulnerability signature data from the asset vulnerability signature repository based on a network zone identifier associated with the network.

19. A non-transitory computer-readable storage medium comprising one or more programs for execution by one or more processors of a device, the one or more programs including instructions which, when executed by the one or more processors, cause the device to:
receive a request to perform an asset vulnerability assessment of one or more assets within a network, the request comprising:
an asset descriptor describing the one or more assets; and
in response to the request:
obtain, based on the asset descriptor, aggregated asset property data associated with the one or more assets, wherein the aggregated asset property data is collected for the one or more assets in one or more levels of the network;
perform the asset vulnerability assessment based on the aggregated asset property data and asset vulnerability signature data stored in an asset vulnerability signature repository;
determine vulnerability for an asset in a level based on a comparison of one or more portions of the aggregated asset property data to one or more portions of the asset vulnerability signature data; and
in response to determining that the asset vulnerability assessment satisfies a defined criterion, perform one or more actions associated with the network.

20. The non-transitory computer-readable storage medium of claim 19, the one or more programs further including instructions which, when executed by the one or more processors, cause the device to:
  generate respective asset risk scores for the one or more assets based on the asset vulnerability assessment; and
  perform the one or more actions associated with the network based on the respective asset risk scores.

\* \* \* \* \*